US007415211B2

(12) United States Patent
Feinberg et al.

(10) Patent No.: US 7,415,211 B2
(45) Date of Patent: Aug. 19, 2008

(54) INTERCONNECTIONS AND PROTECTION BETWEEN OPTICAL COMMUNICATIONS NETWORKS

(75) Inventors: Lee Daniel Feinberg, Silver Spring, MD (US); Darren E. Wolf, legal representative, Pittsburgh, PA (US)

(73) Assignee: Dorsal Networks L.L.C., Broomfield, CO (US)

( * ) Notice: Subject to any disclaimer, the term of this patent is extended or adjusted under 35 U.S.C. 154(b) by 0 days.

(21) Appl. No.: 11/635,180

(22) Filed: Dec. 7, 2006
(Under 37 CFR 1.47)

(65) Prior Publication Data

US 2007/0154219 A1 Jul. 5, 2007

Related U.S. Application Data

(63) Continuation of application No. 10/299,491, filed on Nov. 19, 2002, now abandoned, which is a continuation-in-part of application No. 09/962,535, filed on Sep. 26, 2001, now Pat. No. 7,113,706, and a continuation-in-part of application No. 09/886,409, filed on Jun. 22, 2001, now Pat. No. 6,563,979, and a continuation-in-part of application No. 09/850,141, filed on May 8, 2001, now Pat. No. 6,556,319.

(60) Provisional application No. 60/331,526, filed on Nov. 19, 2001, provisional application No. 60/311,353, filed on Aug. 13, 2001.

(51) Int. Cl.
*H04B 10/00* (2006.01)

(52) U.S. Cl. ........................... 398/104; 396/106

(58) Field of Classification Search ......... 398/104–105, 398/141
See application file for complete search history.

(56) References Cited

U.S. PATENT DOCUMENTS

| 5,675,432 | A | 10/1997 | Kosaka |
| 5,717,796 | A | 2/1998 | Clendening |
| 5,764,405 | A | 6/1998 | Alphonsus |
| 5,896,474 | A | 4/1999 | Van Deventer et al. |
| 5,912,761 | A | 6/1999 | Jander et al. |
| 5,926,263 | A | 7/1999 | Lynch et al. |
| 5,959,767 | A | 9/1999 | Fatehi et al. |
| 5,966,206 | A | 10/1999 | Jander |
| 5,969,833 | A | 10/1999 | Jensen |
| 6,005,694 | A | 12/1999 | Liu |

(Continued)

FOREIGN PATENT DOCUMENTS

JP 2001144693 A 5/2001

OTHER PUBLICATIONS

William C, Marra et al.: "Africa ONE: The Africa Optical Network," IEEE Communications Magazine, Feb. 1996, pp. 50-57.

(Continued)

*Primary Examiner*—Dalzid Singh

(57) ABSTRACT

An optical communications system including a submarine optical communications system, a landing station associated with the submarine optical communications system, a terrestrial optical communications system, a point of presence associated with the terrestrial optical communications system, a first wavelength division multiplexed optical connection between the point of presence and the landing station, and a second wavelength division multiplexed optical connection between the point of presence and the landing station and routed diversely from the first wavelength division multiplexed optical connection.

17 Claims, 28 Drawing Sheets

U.S. PATENT DOCUMENTS

| | | | |
|---|---|---|---|
| 6,016,219 | A | 1/2000 | Fatehi et al. |
| 6,025,949 | A | 2/2000 | Anderson |
| 6,028,684 | A | 2/2000 | Kidorf |
| 6,057,948 | A | 5/2000 | Mizrahi |
| 6,061,156 | A | 5/2000 | Takeshita et al. |
| 6,101,012 | A | 8/2000 | Danagher et al. |
| 6,115,154 | A | 9/2000 | Antoniades et al. |
| 6,134,032 | A | 10/2000 | Kram et al. |
| 6,134,033 | A | 10/2000 | Bergano et al. |
| 6,137,604 | A | 10/2000 | Bergano |
| 6,151,144 | A | 11/2000 | Knox |
| 6,185,022 | B1 | 2/2001 | Harasawa |
| 6,204,945 | B1 | 3/2001 | Iwata et al. |
| 6,211,985 | B1 | 4/2001 | Anderson |
| 6,215,567 | B1 | 4/2001 | Tochio |
| 6,278,655 | B2 | 8/2001 | Lancaster et al. |
| 6,304,351 | B1 | 10/2001 | Pedersen |
| 6,307,653 | B1 | 10/2001 | Bala et al. |
| 6,323,981 | B1 | 11/2001 | Jensen |
| 6,327,250 | B1 | 12/2001 | Chen et al. |
| 6,327,400 | B1 | 12/2001 | Harstead et al. |
| 6,396,969 | B1 | 5/2002 | Sparks et al. |
| 6,414,771 | B2 | 7/2002 | Al-Salameh et al. |
| 6,421,149 | B2 | 7/2002 | Tervonen et al. |
| 6,680,948 | B1 | 1/2004 | Majd et al. |
| 6,731,877 | B1 | 5/2004 | Cao |
| 6,731,879 | B1 | 5/2004 | Frisch et al. |
| 6,848,006 | B1 | 1/2005 | Hermann |
| 2001/0003515 | A1 | 6/2001 | Lancaster et al. |
| 2001/0055309 | A1 | 12/2001 | Alstaetter |
| 2002/0095688 | A1 | 7/2002 | Rich |
| 2002/0150042 | A1 | 10/2002 | Mathieu et al. |
| 2003/0005095 | A1 | 1/2003 | Lee |
| 2004/0105136 | A1 | 6/2004 | Feinberg |

OTHER PUBLICATIONS

Michael W. Chbat, et al: "Toward Wide-Scale All-Optical Transparent Networking: The ACTS Optical Pan-European Network (OPEN) Project," IEEE Journal on Selected Areas in Communications, vol. 16, No. 7, Sep. 1998, pp. 1226-1244.

AT&T Technical Journal: A Journal of the AT&T Companies, vol. 74, No. 1, Jan./Feb. 1995, 106 pages.

S. Namiki, et al., Abstract, "Recent Advances in Ultra-Wideband Raman Amplifiers" Opto-technology Lab., pp. FF-1-FF-3, and "Fibre-DFB Laser WDM Array" from Tutorial Sessions, SN.

P.K. Runge et al., "AT&T Optical Amplifier Systems" AT&T Bell Laboratories Pub., pp. 72-77.

Ravi V. Shankar et al., "Managing the Management Communications Network in Optical Transport Systems" in Bell Labs Technical Journal, Oct.-Dec. 1999, pp. 155-170.

N.S. Bergano, "Undersea Amplified Lightwave Systems Design" AT&T Laboratories Pub., pp. 302-335.

AT&T Technical Journal, "Undersea Communications Technology", AT&T Technical Journal, Jan./Feb. 1995, vol. 74, No. 1.

C. De Maindreville, et al., Submarine Network Management: Architectural Issues, "Abstract", pp. 573-580.

Bell Labs Technical Journal, Oct.-Dec. 1999, pp. 138-154.

Ellen Brain et al., "Ten Years of Operating Light Wave Systems" pp. 203-209.

I.P. Kaminow, "Optical Fiber Telecommunications IIIB", pp. 101-103.

N.S. Bergano et al., "Polarization Scrambling Improves SNR Performance in a Chain of EDFAs" in OFC 94-Technical Digest Pub., pp. 255-256.

C. A. Siller, Jr. et al., "Sonet SDH—A SourceBook of Synchronous Networking", IEEE Communications Society, pp. 262.265.

INTERCONNECTIONS AND PROTECTION BETWEEN OPTICAL COMMUNICATIONS NETWORKS

CROSS-REFERENCE TO RELATED APPLICATIONS

This application is a continuation of U.S. patent application Ser. No. 10/299,491. filed Nov. 19, 2002, which claims priority from U.S. patent application Ser. No. 09/962,535, filed on Sep. 26, 2001, now U.S. Pat. No. 7,113,706 which claims priority to U.S. Provisional Patent Application Ser. No. 60/311,353, filed Aug. 13, 2001; Ser. No. 10/299,491 also claims priority from U.S. Provisional Patent Application Ser. No. 60/331,526, filed Nov. 19, 2001; Ser. No. 10/299,491 also claims priority from U.S. patent application Ser. No. 09/850,141, filed on May 8, 2001, now U.S. Pat. No. 6,556,319; and Ser. No. 10/299,491 also claims priority from U.S. patent application Ser. No. 09/886,409, filed on Jun. 22, 2001, now U.S. Pat. No. 6,563,979; all of which are incorporated herein by reference.

STATEMENT REGARDING FEDERALLY SPONSORED RESEARCH AND DEVELOPMENT

Not Applicable.

BACKGROUND OF THE INVENTION

1. Field of the Invention

This invention relates generally to interconnections and optical protection in optical communication networks.

2. Description of Related Art

Recently, optical communications have become established as a next generation communication technology. Advances in optical fibers that carry optical data signals, and in techniques (e.g., wavelength division multiplexing (WDM)) for efficiently using the available bandwidth of such fibers, have caused optical technologies to be utilized in state-of-the-art long haul communication systems. As used herein, "WDM" may include either or both of the functions of multiplexing (i.e., multiple signals into one signal) and demultiplexing (i.e., one signal into multiple signals).

Depending upon the relative locations of the data source and the intended recipient, optical data signals may traverse different optical communication systems between the two locations. One example of this occurs in trans-oceanic (e.g., trans-Atlantic) data connections. For example, optical signals may travel along both a terrestrial optical communication system and a submarine optical communication system.

FIG. 1 is a schematic diagram of an exemplary optical communication system 100 that includes an undersea, or submarine, portion. The optical communication system 100 may include two land-based, or terrestrial, WDM terminals 110 and 140 that are connected by a submarine optical fiber 120, perhaps in the form of an undersea cable. The submarine optical fiber 120 may connect to one or more line units 130 that are used to amplify the optical signal in the fiber 120. Line units 130 are also sometimes referred to as "repeaters." Although communication may be shown in one direction in FIG. 1 and elsewhere herein, those skilled in the art will appreciate that communication may be bi-directional, for example by using a pair of optical fibers or other known methods of bi-directional optical communication.

For "long haul" (e.g., greater than or equal to several hundred kilometers) optical communications, the optical signal may be periodically amplified to compensate for attenuation in the fiber 120. As many line units 130 are used as necessary to amplify-the transmitted signal so that it arrives at WDM terminal 140 with sufficient signal strength (and quality) to be successfully detected and transformed back into a terrestrial optical signal. The terminals 110 and 140 may contain all of the components needed to process the terrestrial optical signals to and from submarine optical signals.

FIG. 2 is a block diagram of an exemplary terminal unit 110 of the optical communication system 100. The terminal unit 110 may include long reach transmitters/receivers (LRTRs) 210, WDM and optical conditioning equipment 220, link monitor equipment 230, line current equipment 240, a backplane 250, and a network management system 260. All of this equipment has typically been housed in one or more cabinets (not shown) disposed at a cable landing site (also referred to as a cable landing station, or merely "cable station") near the point at which the undersea cable 120 exits the submarine optical communication system.

The LRTRs 210 may be configured to convert terrestrial optical signals into an optical format suitable for long haul transmission. The LRTRs 210 also may be configured to convert the undersea optical signal back into its original terrestrial format and provide forward error correction for the submarine line. The WDM and optical conditioning unit 220 may be configured to multiplex and amplify the optical signals in preparation for their transmission over cable 120 in a transmitting direction. In the opposite (i.e., receiving) direction, the WDM and optical conditioning unit 220 may demultiplex optical signals received from cable 120. The link monitor equipment 230 may be configured to monitor the undersea optical signals and undersea equipment for proper operation. The line current equipment 240, which may also be referred to as power feed equipment (PFE), provides power to, for example, the undersea line units 130 coupled to the undersea cable 120.

As these optical systems are upgraded and/or new submarine optical communication systems are deployed, the number of channels and number of optical fibers associated with each system may increase dramatically. Retrofitting existing cable landing stations to handle new equipment may not be commercially feasible. At the same time, acquiring new landing sites may be equally challenging. In the related application, techniques for modifying or adding system equipment, while minimizing cable landing station access and space usage are described.

In addition to minimizing cable landing station access and space usage, it would further be desirable to provide techniques and architectures which will permit two faults to be handled when submarine rings are connected to terrestrial backhauls.

For underwater optical networks, a additional problem exists in shallow waters due to dragging boat anchors and the like, which may make contact with fiber optic lines and thereby cause damage or cuts to those lines. This problem also may occur for land-laid optical networks, whereby certain portions of fiber optic cable laid below ground are more susceptible to damage than other portions of the fiber optic cable. For example, if a fiber optic cable is provided between Baltimore, Md. and New York, N.Y., then there is a higher probability of damage to the fiber optic cable located at the two cities, due to building and road construction and repair, than along locations between the cities in which the fiber optic cable is laid.

Presently, fiber optic systems use one of two schemes that incorporate path diversity in regions where there is a high probability of fiber cut. In one scheme, fiber bundle legs are split at branch units and half of the fibers are routed along two different paths. In the other scheme, each wavelength division multiplexed (WDM) fiber is split/combined at the branch units by wavelength using wavelength splitters and combiners. In either case, half of the bandwidth is routed over two separate diverse paths. If one of the two fiber bundles is cut in the region where there is a high probability of fiber cuts, half of the total bandwidth is lost in the region where there is a low probability of fiber cuts. Accordingly, there is a need for a fiber optic system using a branch unit to route entire fiber bundles diversely, to avoid losing half of the bandwidth when one or more of the fiber bundles is damaged in the region where there is a high probability of fiber cuts.

Typically, conventional optical communication systems comprise a receiving node and a transmitting node (Baltimore, Md. and New York, N.Y. in the aforementioned example) connected via optical fiber. Each node contains equipment for communication via optical fiber. Such equipment includes channel equipment and WDM equipment. A fiber-bay comprises channel equipment and WDM equipment. Channel equipment is equipment that transmits and receives via a specific channel. A line unit is a repeater that optically amplifies WDM signals on an optical fiber.

Also, for fiber optic networks, problems in transmitting and receiving signals may be due to equipment failure, such as switch failure, or it may be due to failure of the signal lines, such as the fiber optic lines which provide signals from a source to a destination.

Typically, conventional optical communication systems comprise a receiving node and a transmitting node connected via optical fiber. Each node contains equipment for communication via optical fiber. Such equipment may include channel equipment and Wavelength Division Multiplex (WDM) equipment. Channel equipment is equipment that transmits and receives via a specific wavelength (or channel). In a conventional system, if a fiber is cut resulting in a loss of signal, the system requires a network element (such as a SONET processor) to determine there is a failure in the digital domain and notify the switch to change state.

Further, switches are utilized to direct signals transmitted by the nodes to various fiber optical cables within a conventional optical communication system. When a switch fails in a conventional system, an operator manually reconfigures the switch to communicate via an alternate channel. The resulting down time from manually switching channels results in a high amount of data loss and an inefficient use of backup resources.

SUMMARY OF THE INVENTION

Systems and processes consistent with the principles of the invention may, among other things, allow multiplexing and other processing of a signal from an undersea optical cable to be performed at a customer's point of presence, while also permitting various faults to be accommodated either in the submarine or terrestrial portion of interconnected optical communication networks.

In accordance with one purpose of the invention as embodied and broadly described herein, a system for delivering optical signals to and from an undersea optical cable may include a cable landing station connected to the undersea optical cable and configured to convey a wavelength division multiplexed optical signal from the undersea optical cable. The system may also include a point of presence that includes wavelength division multiplexing equipment configured to convert the wavelength division multiplexed optical signal to a number of optical channels. At least two diversely routed optical fiber links may be coupled between the cable landing station and the point of presence to transport the wavelength division multiplexed optical signal from the cable landing station to the point of presence. The cable landing station may include a fiber switch that selectively connects the at least two optical fiber links coupled between the cable landing station and the point of presence with two submarine links.

Another aspect of the present invention is directed to an optical network architecture that operates effectively when fiber cuts occur on service lines. The optical network architecture includes a primary branch path and a secondary branch path, wherein both paths are provided on a region of high fiber cut probability of the optical network architecture, and wherein identical transmission signals are provided on the primary and secondary branch paths. The primary and secondary branch paths meet at a branch point, wherein a branch unit is located at the branch point. The branch unit includes a combiner that combines signals received on the primary and secondary branch paths, and outputs the combined signal onto a main optical path. The main optical path is located at a low probability of fiber cut of the optical ring architecture. Optionally, multiple branches may be incorporated and combiners used on subsets of fibers at each branch. The main optical path may branch multiple times, or a branched optical path may branch again for example.

In a first operation mode, at least one of the line units on the secondary branch path (preferably the last one or last few line units on that path that are closest to the branch unit) has its pump laser set to a zero or nearly-zero power output state, so as to attenuate any signals sent over the secondary branch path. In the first operation mode, each of the line units on the primary branch path has its respective pump laser set to a normal power output state. Alternatively, it can be a power output state anywhere between the zero (or near-zero) power output state and the maximum power output state (and it may even be the maximum power output state in some circumstances).

At the output of the combiner there is a 2% tap with light provided to a detector, such as a photodiode detector. If the photodiode detector does not detect any signal or if the signal quality is poor at the output of the combiner for at least a fixed time period, then it is determined that the primary branch path has a problem, and then the at least one line unit on the secondary branch path is instructed to set its pump laser to the normal power output state, so that the backup signal will be received by the combiner from the secondary branch path, due to the problem in receiving the primary (also called "service") signal from the primary branch path. The line units on the primary branch path optionally are instructed to set their respective pump lasers to the zero power output state. After the primary branch path has been fixed, then the system can be set back to a first operating mode, in which the combiner receives the primary signals from the primary branch path and not the backup signals from the secondary branch path.

In an alternative configuration, a 1×2 switch (typically a high reliability switch) is provided at the branch unit instead of the passive combiner, whereby signals are provided to the two inputs of the 1×2 switch from both the primary branch path and the secondary branch path. The primary branch input is provided to the output of the 1×2 switch under normal operating conditions. When the output of the 1×2 switch is detected to be below a threshold level, thereby indicating a problem on the primary branch path, the 1×2 switch is switched to provide the input from the secondary branch path to the output of the 1×2 switch. The output of the 1×2 switch is provided to a main optical path, which provides fiber optic signals over a region having a low probability of fiber cuts.

Another aspect of the present invention is directed to overcoming equipment failure, such as a switch failure, or signal line failure, such as an optical fiber cut.

For example, a fiber optic system is provided comprising a primary transmission path provided from a source, a secondary transmission path provided from the source, and a network protection unit coupled to the primary and secondary transmission paths provided from the source. The network protection unit comprises a first 1×2 switch, a second 1×2 switch, and a third 1×2 switch.

The first 1×2 switch comprises a first input optically coupled to the primary transmission path, a second input optically coupled to the secondary transmission path, and an output. The second 1×2 switch comprises a second input optically coupled to the primary transmission path, a first input optically coupled to the secondary transmission path, and an output. The third 1×2 switch comprises a first input optically coupled to the output of the first switch, a second input optically coupled to the output of the second switch, and an output optically coupled to an output transmission path.

In a first mode of operation, the first and third switches are set to provide the primary signal to the output transmission path. In a second mode of operation, the first and third switches are set to provide the secondary signal to the output transmission path. In a third mode of operation, the second and third switches are set to provide the primary signal to the output transmission path. In a fourth mode of operation, the second and third switches are set to provide the secondary signal to the output transmission path.

In another aspect of the present invention, a fiber optic system is provided comprising a primary transmission path provided from a source, a backup transmission path provided from the source, and a branch unit provided at a meeting point of the primary and backup transmission paths.

The branch unit comprises a first 2×2 switch, a second 2×2 switch, a third 2×2 switch, and a processor. The first 2×2 switch comprises a first input optically coupled to the primary transmission path, a second input optically coupled to the secondary transmission path, a first output, and a second output optically connected to a detector. The second 2×2 switch comprises a second input optically coupled to the primary transmission path, a first input optically coupled to the secondary transmission path, a first output, and a second output optically coupled to a detector. The third 2×2 switch comprises a first input optically coupled to the first output of the first 2×2 switch, a second input optically coupled to the first output of the second 2×2 switch; a first output, and a second output.

The processor receives information from the detectors regarding the detected signal strength at the second output port of the first 2×2 switch and the second output port of the second 2×2 switch. The first 2×2 switch operates in either a first mode that provides input received on its first input to its first output and input received on its second input to its second output, or a second mode that provides input received on its first input to its second output and input received on its second input to its first output. The second 2×2 switch operates in either a first mode that provides input received on its first input to its first output and input received on its second input to its second output, or a second mode that provides input received on its first input to its second output and input received on its second input to its first output. The processor commands the first and second 2×2 switches to operate in one of the first mode of operation and the second mode of operation, based on the information received from the detectors.

In another aspect of the present invention, a fiber optic system is provided comprising a primary transmission path provided from a source, a backup transmission path provided from the source, and a branch unit provided at a meeting point of the primary and backup transmission paths.

The branch unit comprises a first 2×2 switch, a second 2×2 switch, a detector, and a processor. The first 2×2 switch comprises a first input optically coupled to the primary transmission path, a second input optically coupled to the secondary transmission path, a first output, and a second output. The second 2×2 switch comprises a first input optically coupled to the first input of the first 2×2 switch, a second input optically coupled to the second input of the second 2×2 switch, and an output optically coupled to a main transmission path. The detector is optically coupled to an output of the second 2×2 switch. The processor is in communication with the detector for controlling the first 2×2 switch and the second 2×2 switch.

The first 2×2 switch operates in either a first mode that provides input received on its first input to its first output and input received on its second input to its second output, or a second mode that provides input received on its first input to its second output and input received on its second input to its first output. The second 2×2 switch operates in either a first mode that provides input received on its first input to an output, or a second mode that provides input received on its second input to an output. The processor commands the first 2×2 switch and second 2×2 switch to operate in one of the first mode of operation and the second mode of operation, based on the information received from the detector.

In another aspect of the present invention, a method of providing fiber optic signals on a fiber optical network is provided, the method comprising the steps of providing, from a source, a primary signal on a primary transmission path, providing, from the source, a backup signal on a backup transmission path, receiving the primary and backup signals on the primary and backup transmission paths, respectively, and outputting only one of the primary and backup signals onto an output port that correspond to a main optical path, by way of at least two switches, detecting a signal strength on the main optical path, and determining, based on signal strength or quality, whether or not to operate in a first mode of operation, in which the primary signal is provided to the main optical path, or in second mode of operation, in which the backup signal is provided to the main optical path.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

As described herein, in one implementation, wavelength division multiplexing and submarine line termination equipment may be located at a customer's point of presence. The location of such equipment may reduce the amount of access to and space needed in a cable landing station. Initially, several exemplary configurations found in the above-identified, related application are provided for context. Then, several architectures according to the present invention for fault handling using such architectures will be described.

Exemplary System Configurations

Figure 1:
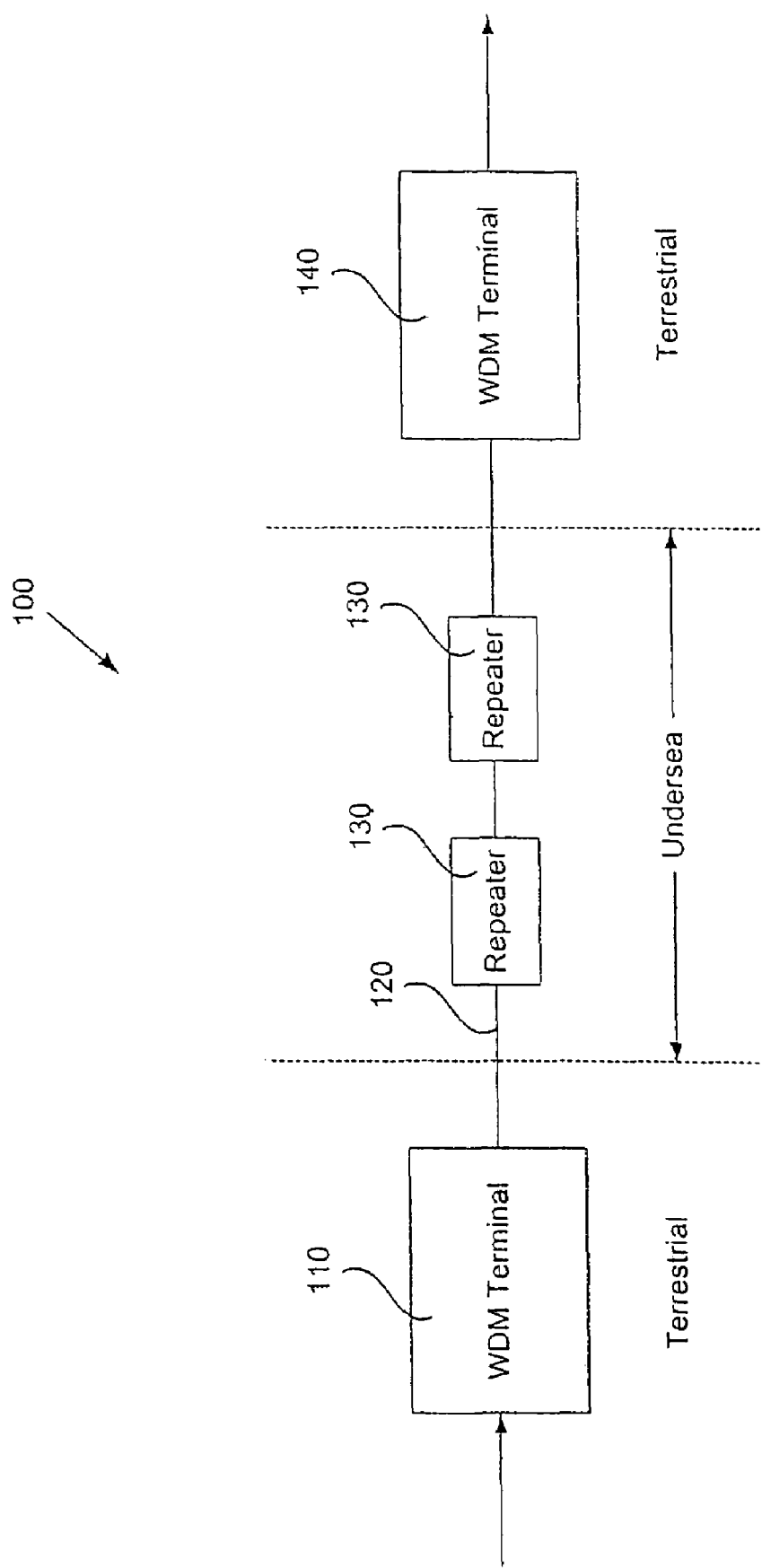
FIG. 1 is a schematic diagram of an exemplary optical communication system.
Figure 2:
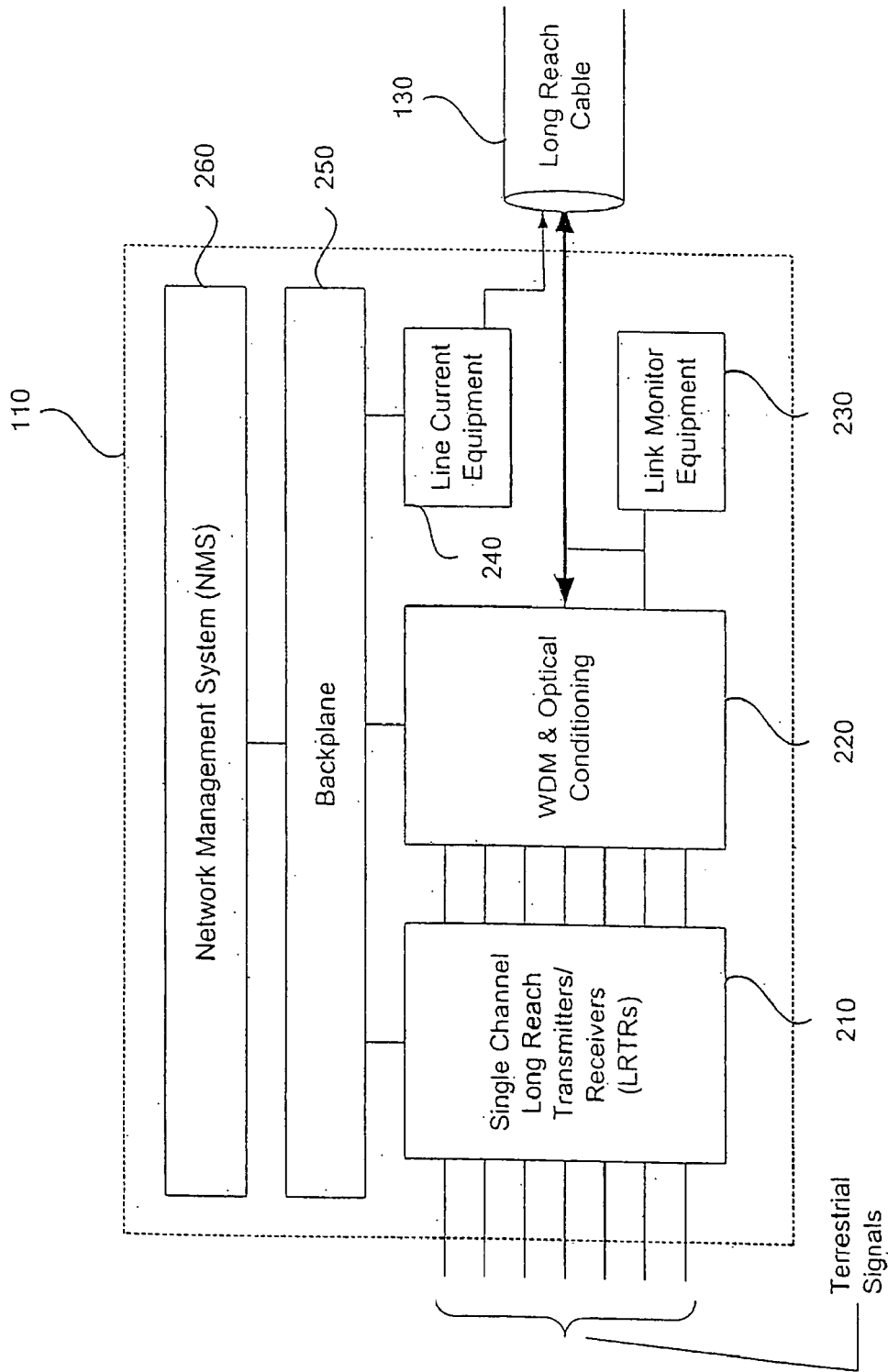
FIG. 2 is a block diagram of an exemplary terminal unit of the optical communication system in FIG. 1.
Figure 3:
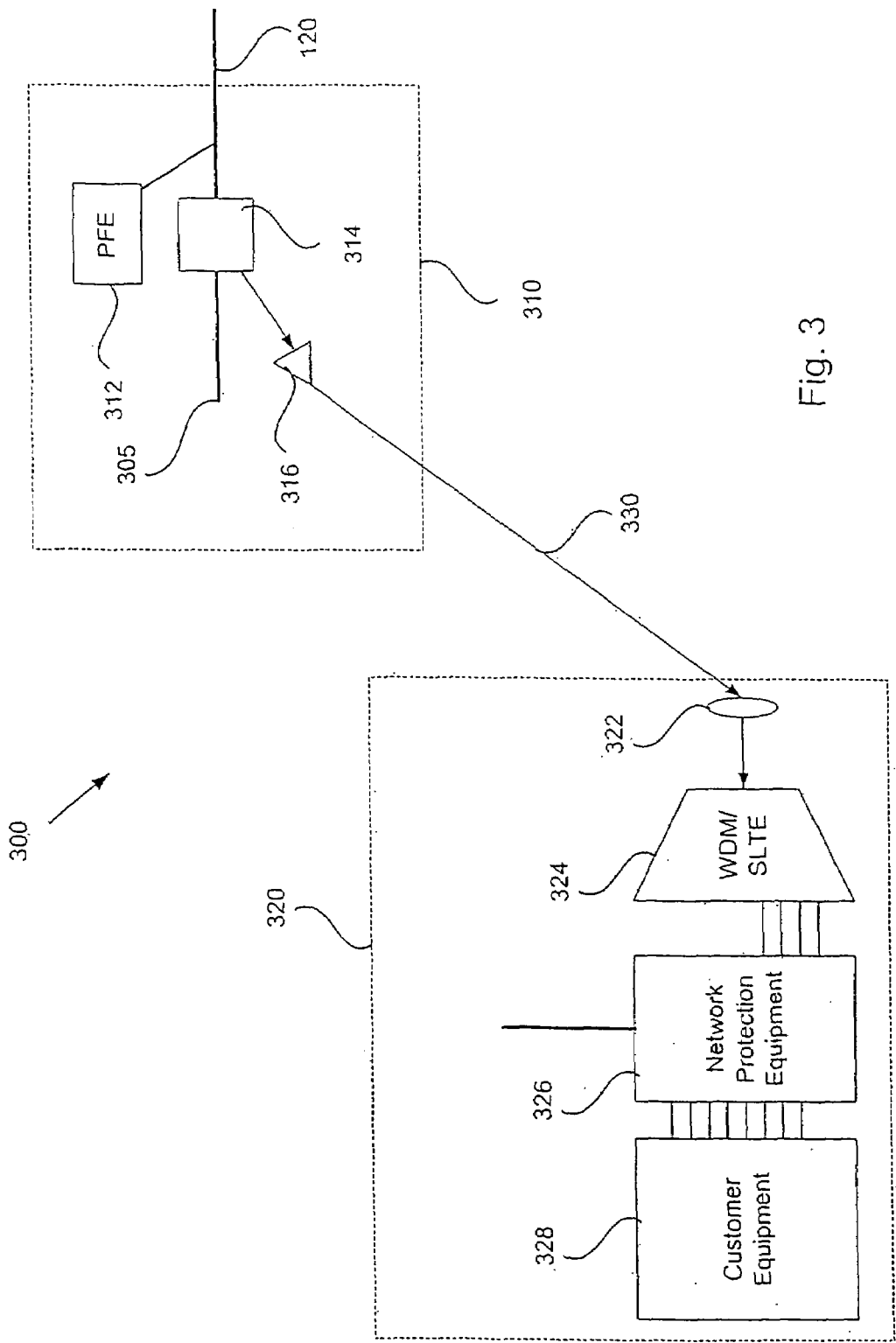
FIG. 3 is a block diagram of an exemplary optical system consistent with the principles of the present invention where a WDM unit is not housed in the cable landing station.

FIG. 3 is a block diagram of an exemplary optical system 300 consistent with the principles of the present invention. The optical system may include an undersea cable 120, a cable landing station 310, a point of presence (POP) 320, and a terrestrial fiber 330 connecting the cable station 310 and the POP 320. Typically, a company which provides optical signals from the undersea cable 120 may be distinct from the company that owns and operates the POP 320. As the latter company may be a customer of the former company, the POP 320 may also be referred to as a "customer's POP."

The cable landing station 310 may include an optical cable 305, power feed equipment (PFE) 312, a branching device 314, and an optical amplifier 316. These components allow the cable landing station 310 to forward a received WDM submarine optical signal to the POP 320. The optical cable 305 may carry the same signals as the submarine optical cable 120, and it may carry the signals to other equipment in the cable landing station 310 or to other POPs.

The PFE 312 may be configured to provide power to, for example, the undersea line units 130 coupled to the undersea cable 120. In present invention, the PFE 312 provides power to the undersea cable portion of the system, but only to a portion or not at all to the terrestrial portion of the system. In this manner, one optical path spans the entire the system, both undersea and terrestrial, while multiple electrical systems are employed to provide power to the optical system. In an exemplary embodiment, the PFE 312 provides power only to the undersea line units 130 via the undersea cable. The WDM 220, SLTE, and any terrestrial optical amplifiers 316 are provided power independently from the PFE 312, and possibly from each other depending upon the physical location of the equipment. Typically, terrestrial and SLTE equipment that is colocated at a facility can be provided power from a common power feed source; whereas, diversely located terrestrial equipment will be provide power from a different power feed source.

The branching device 314 may be configured to route the WDM submarine optical signal from the undersea cable 120 to the POP 320 along the optical fiber 330. The optical amplifier 316 may be provided to amplify the WDM signal by a suitable amount to reach the POP 320 with sufficient strength. If the signal will have sufficient strength at the POP 320 without amplification, the optical amplifier 316 need not be provided. Examples of the optical amplifier 316 may include a narrowband erbium doped fiber amplifier (EDFA) or a Raman amplifier.

The terrestrial fiber link 330 may be, for example, 20 km or more in length. Although shown as a single line in FIG. 3, the fiber link 330 may include a pair or pairs of fibers configured to provide bi-directional (i.e., transmitting and receiving) communication.

The POP 320 may include an amount of dispersion compensating fiber (DCF) 322, a WDM/submarine line terminating equipment (SLTE) unit 324, network protection equipment (NPE) 326, and other customer equipment 328. The DCF 322 may be inserted in the optical path to compensate for any additional dispersion experienced by the WDM signal as it traverses the terrestrial fiber link 330. Alternately, the DCF 322 may be contained in, for example, the WDM/SLTE unit 324. Line terminating equipment of this type may contain an amount (e.g., 70 km) of DCF to "pre-compensate" for downstream fiber dispersion. Accordingly, the system 300 may be designed to take advantage of any DCF already present in the WDM/SLTE unit 324.

The WDM/SLTE unit 324 may be configured to demultiplex, detect and, optionally, error correction decode the WDM signal. The WDM/SLTE unit 324 may then output terrestrial speed optical signals (e.g., OC 192 SONET signals) to network protection equipment 326. In the opposite direction, the WDM/SLTE unit 324 may process a terrestrial optical signal (e.g., an OC 192 signal) into a submarine WDM signal. For example, the WDM/SLTE unit 324 may error correction code the terrestrial signals, preemphasize them (to compensate for long haul non-linearities in the submarine line 120), modulate each onto a predetermined wavelength channel with a suitable modulation (e.g., non-return to zero (NRZ)) and wave division multiplex the terrestrial signals together.

The network protection equipment 326, in addition to protecting the customer equipment 328, may provide the OC 192 data to the customer equipment 328, or to other POPs (not shown) that do not include the line terminating equipment 324.

The system 300 includes a single terrestrial fiber link 330 between the cable terminal 310 and the POP 320. The risk that such a single link 330 may be inadvertently cut might be unacceptable. Moreover, a system operator may be unable to determine whether errors in the OC-192 data streams provided to the customer equipment 328 are from problems with the undersea optical cable 120, or the terrestrial link 330. These issues may be addressed by one or more of the exemplary systems illustrated in FIGS. 4-9.

Figure 4:
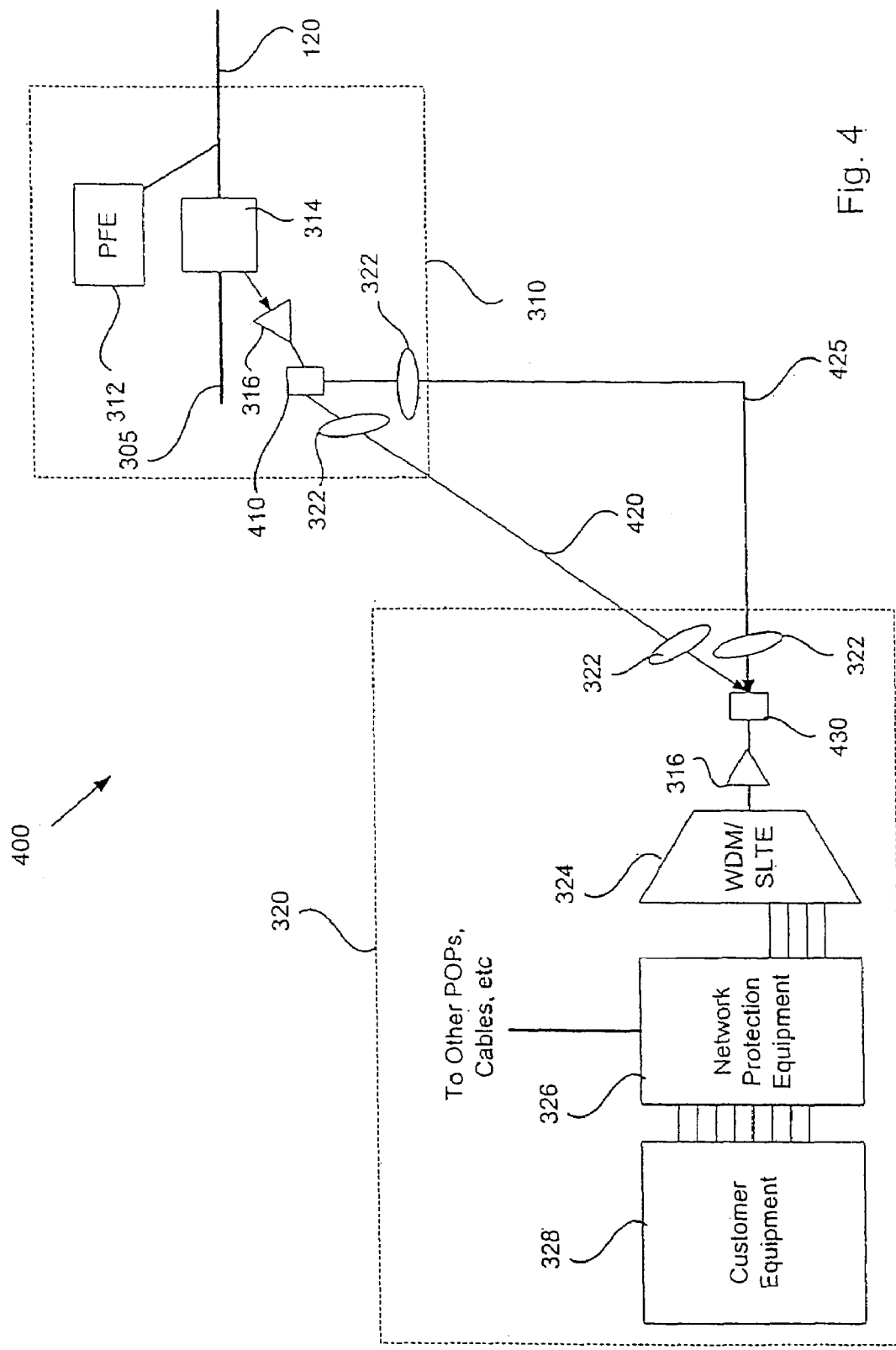
FIG. 4 is a block diagram of an exemplary optical system consistent with the principles of the present invention incorporating a 1+1 terrestrial fiber arrangement.

FIG. 4 is a block diagram of an exemplary optical system 400 that incorporates a 1+1 terrestrial fiber arrangement. Where elements have the same reference numerals as in FIG. 3, these elements will not be described again. Optical system 400 may include an optical splitter 410 in the cable station 310, first and second terrestrial fiber links 420 and 425, and an optical switch 430 in the POP 320. The first and second terrestrial fiber links 420 and 425 are typically spatially separate, and provide redundancy and protection against a fiber cut. Such dual fiber redundancy may be termed "1+1 protection."

The splitter 410 may include, for example, a 3 dB, 50/50 splitter, which may receive the WDM optical data signal from the branching unit 314 and split the signal in two. One of the split signals may be transmitted over fiber link 420, and the other split signal may be transmitted over fiber link 425. Each of the split signals may be attenuated by about 3 with respect to the WDM optical signal input to the splitter 410. The switch 430 may include, for example, a 1×2 optical switch configured to selectively pass the WDM signal from either fiber 420 or fiber 425 to WDM/SLTE unit 324. With the switch configured in such a manner if, for example, problems occur on fiber 420, then the system 400 can switch over to fiber 425. Operational details of the switch 430 will be discussed further with respect to FIG. 9.

As mentioned previously, although only one transmission direction is shown in FIG. 4, the fiber links 420 and 425 may each include a pair of fibers. Although not shown, the cable station 310 may include a switch 430, and the POP 320 may include a splitter 410 for transmission in the opposite direction.

Figure 5:
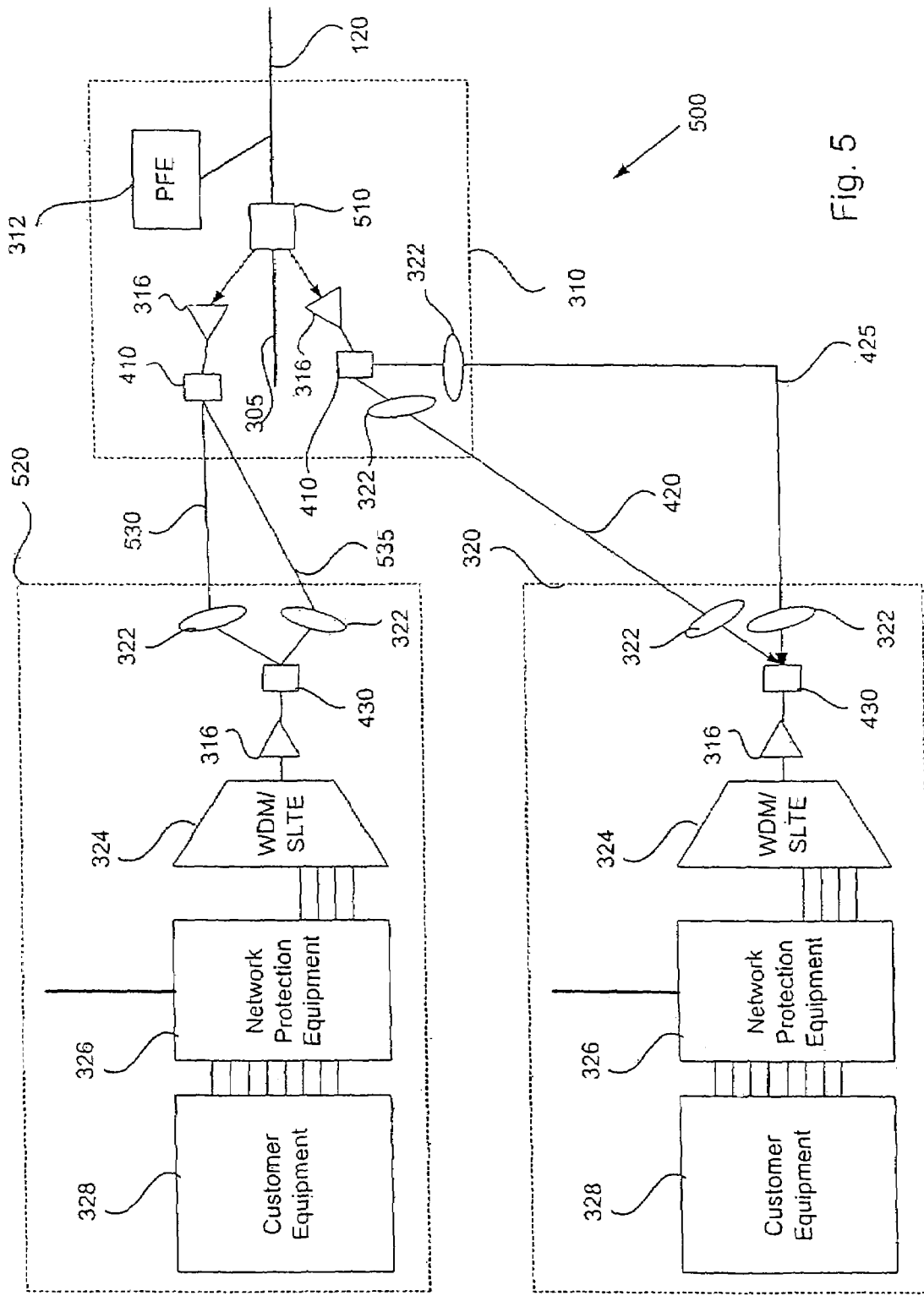
FIG. 5 is a block diagram of an exemplary optical system consistent with the principles of the present invention for transmitting WDM data to two points of presence.

FIG. 5 is a block diagram of an exemplary optical system 500 that transmits data to and from two POPs. Where elements have the same reference numerals as in FIG. 3 and 4, these elements will not be described again. Optical system 500 may include an optical splitter 510 in the cable station 310, a second POP 520, and third and fourth terrestrial fiber links 530 and 535 connecting the cable station 310 to the second POP 520. The third and fourth terrestrial fiber links 530 and 535 provide 1+1 protection for the second POP 520.

The splitter 510 may include a wavelength splitter or a 1×N broadband optical splitter. A wavelength splitter may send one range of wavelengths to POP 320 and another range of wavelengths to POP 520. In one implementation, the 1×N broadband optical splitter may include the 3 dB 50/50 broadband splitter 410. However, system 500 may include more than the two POPs 320 and 520. In such a case, the splitter 510 may be a 1×3, 1×4, etc. broadband optical splitter. Alternately, the splitter 510 maybe some combination of wavelength splitters and 1×N broadband splitters, depending on a number and configuration of POPs in system 500. In the opposite (i.e., receiving) direction, the splitter 510 may include an N to 1 broadband combiner or a wavelength combiner to produce the WDM signal on undersea cable 120.

In another implementation consistent with the present invention, the cable station 310 may receive a number of distinct fiber pairs (e.g., four or more). The cable station may include hardware to route the distinct fiber pairs to different POPs (e.g., one distinct fiber pair to POP 320, another distinct fiber pair to POP 520, etc.).

In a further implementation consistent with the present invention, the POPs 320 and 520 may be connected to each other via terrestrial fiber links (not shown). Such connections would provide "ring" connectivity among the POPs 320/520 and the landing station 310. In such a ring-connected system, some channels may terminate in POP 320 and other channels may terminate in POP 520. The channels which do not terminate in a given POP may be passed through to another POP to provide protection against the destruction of one or more terrestrial fiber links. In another implementation consistent with the present invention, a number of POPs each may be connected to two or more other POPs. Such so-called "mesh" connectivity provides a larger number of paths to a given POP in the event of a fiber failure than, for instance, ring connectivity. The added redundancy of mesh connectivity comes at the expense of a larger number of terrestrial fiber links among the POPs.

Figure 6:
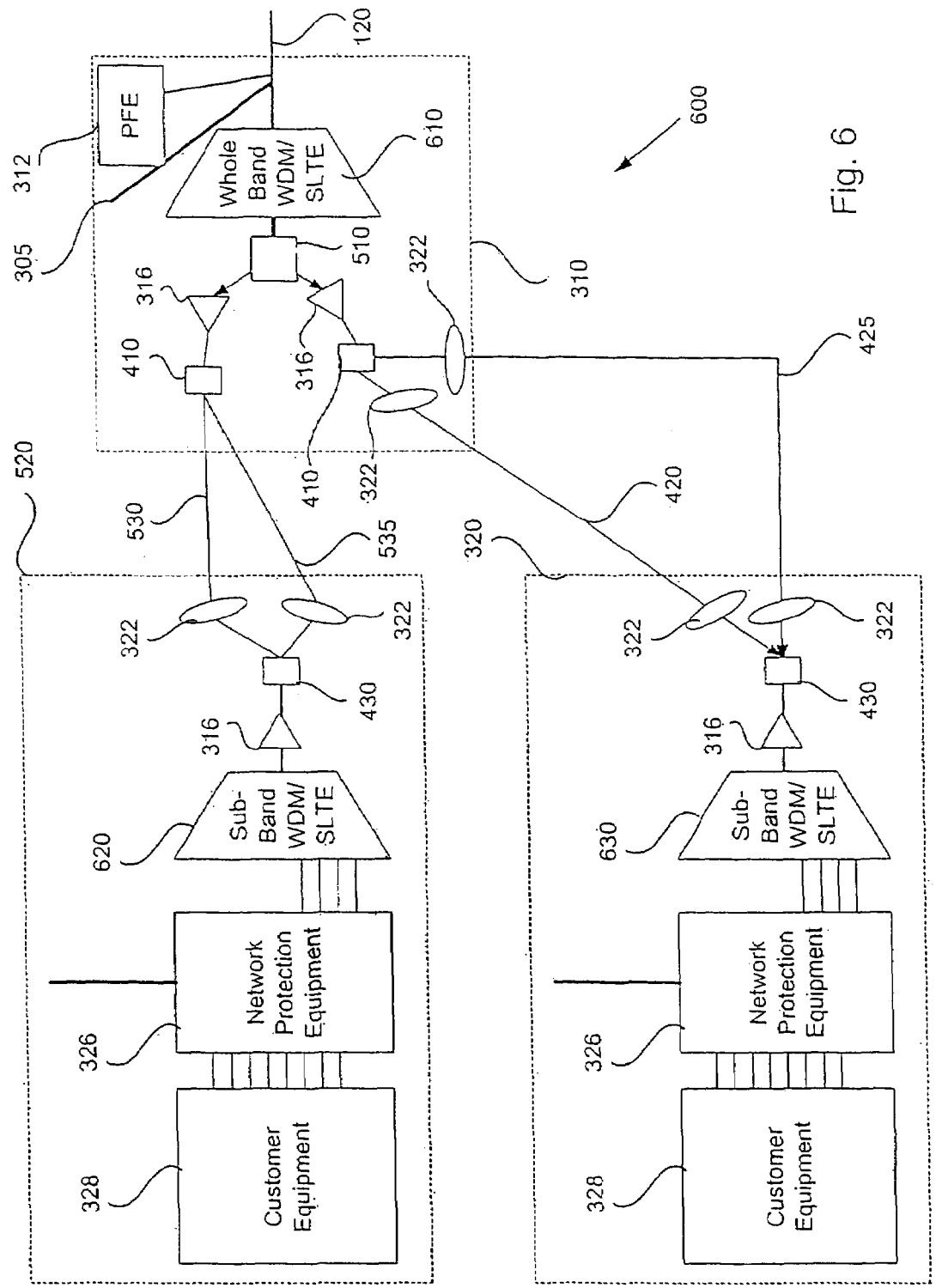
FIG. 6 is a block diagram of an exemplary optical system consistent with the principles of the present invention with sub-band WDMs in the points of presence.

FIG. 6 is a block diagram of an exemplary optical system 600 with sub-band WDMs in the points of presence. Where elements have the same reference numerals as in FIG. 3-5, these elements will not be described again. Optical system 600 may include a whole band WDM/SLTE 610 in the cable station 310 and sub-band WDM/SLTEs 620 and 630 in the POPs 520 and 320. The WDM signals from the submarine cable 120 are partially demultiplexed/multiplexed by whole band WDM/SLTE 610 and further demultiplexed/multiplexed by sub-band WDM/SLTEs 620 and 630. For example, the whole band WDM/SLTE 610 may split the WDM signal into two signals in different wavelength regions. The first of these signals may be fully demultiplexed/multiplexed by sub-band WDM/SLTE 620, and the second of these may be fully demultiplexed/multiplexed by sub-band WDM/SLTE 630.

Figure 7:
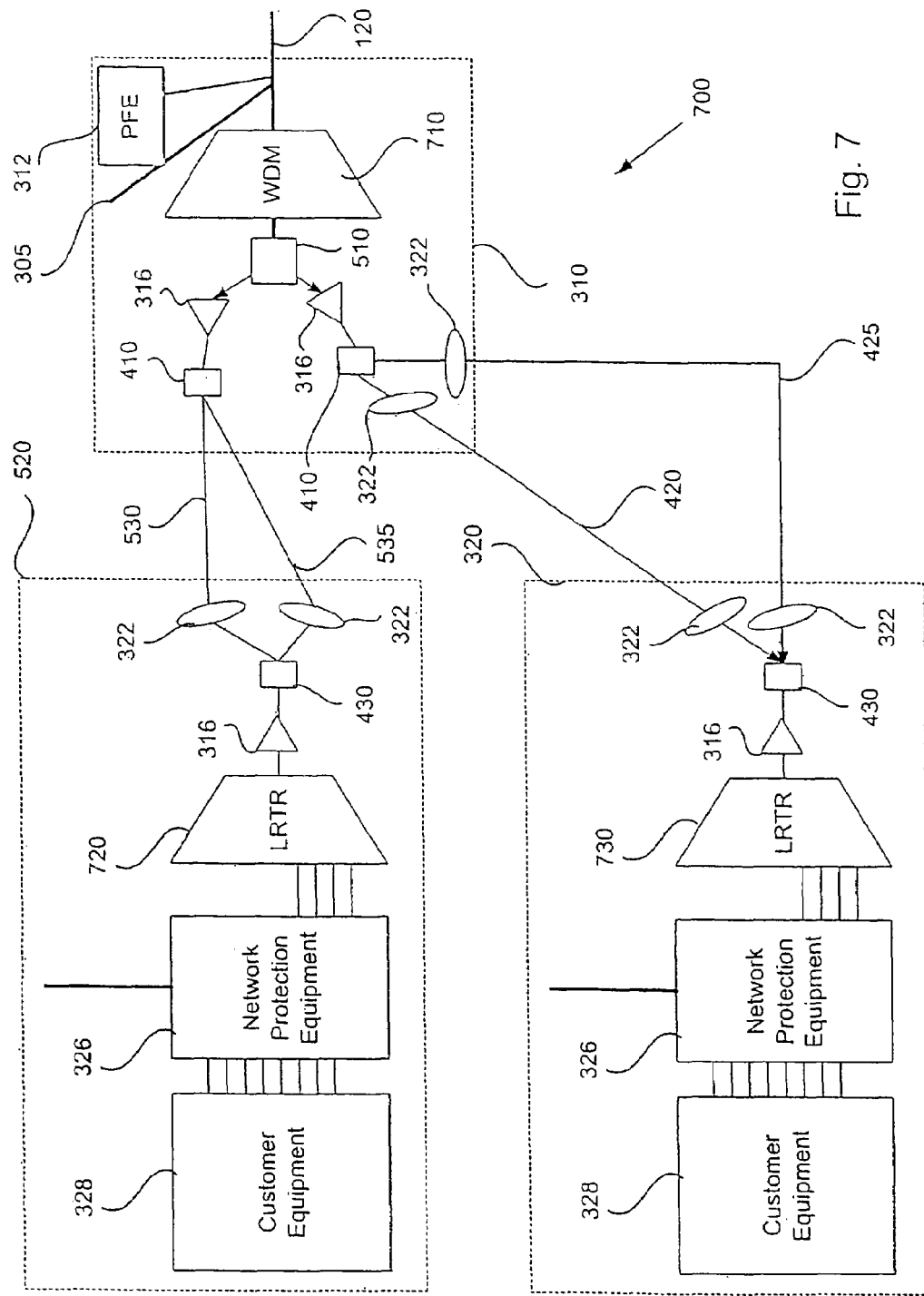
FIG. 7 is a block diagram of an exemplary optical system consistent with the principles of the present invention with LRTRs in the points of presence.

FIG. 7 is a block diagram of an exemplary optical system 700 consistent with the principles of the present invention with LRTRs in the points of presence. Where elements have the same reference numerals as in FIG. 3-6, these elements will not be described again. The system 700 may include a WDM unit 710 in the cable station 310, and LRTRs 720 and 730 in the POPs 520 and 320. The WDM unit 710 may provide full multiplexing/demultiplexing for the WDM signal from and to the submarine cable 120. That is, the WDM unit 710 may output a single wavelength to each of the POPs 520 and 320. The LRTRs 720/730 may be configured to convert terrestrial optical signals into an optical format suitable for long haul transmission over the cable 120. The LRTRs 720/730 also may be configured to convert the undersea optical signal back into its original terrestrial format and provide forward error correction. The system 800 may be desirable when, for example, there are a large number of POPs.

Figure 8:
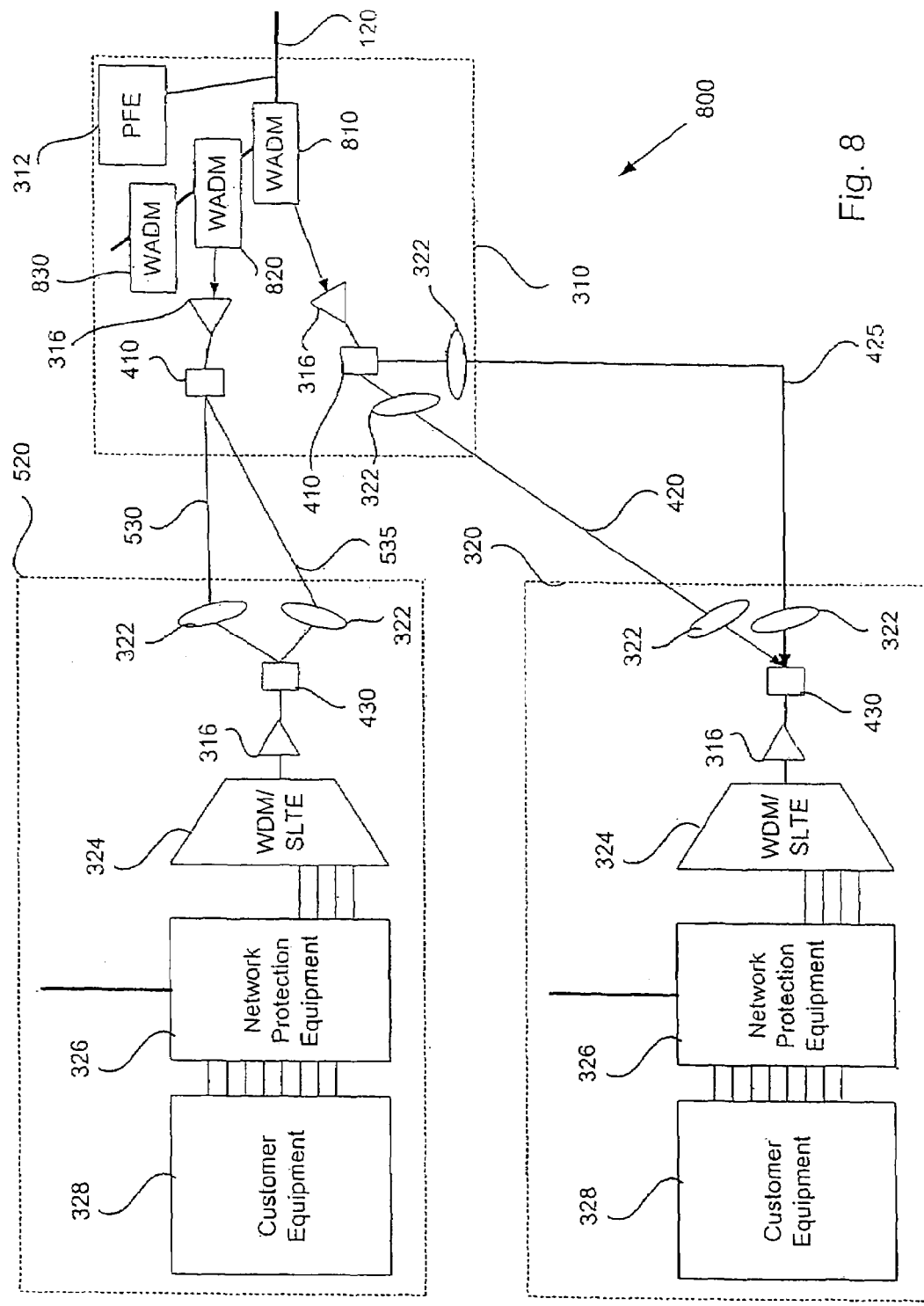
FIG. 8 is a block diagram of an exemplary optical system consistent with the principles of the present invention with wavelength add-drop multiplexers in the cable landing station.

FIG. 8 is a block diagram of an exemplary optical system 800 with a number of wavelength add-drop multiplexers in the cable landing station. Where elements have the same reference numerals as in FIG. 3-7, these elements will not be described again. The wavelength add-drop multiplexers (WADMs) 810-830 may be configured to selectively add/drop wavelengths for each POP 320, 520, etc. For example, each of the WADMs 810-830 may be configured to forward a certain set of wavelengths to the POP associated with it. The set of wavelengths sent by a particular WADM 810-830 may be programmed or otherwise fixed remotely. In this way, POPs 320, 520, etc. may dynamically receive fewer or more wavelengths simply by adjusting the WADM units 810-830.

Figure 9:
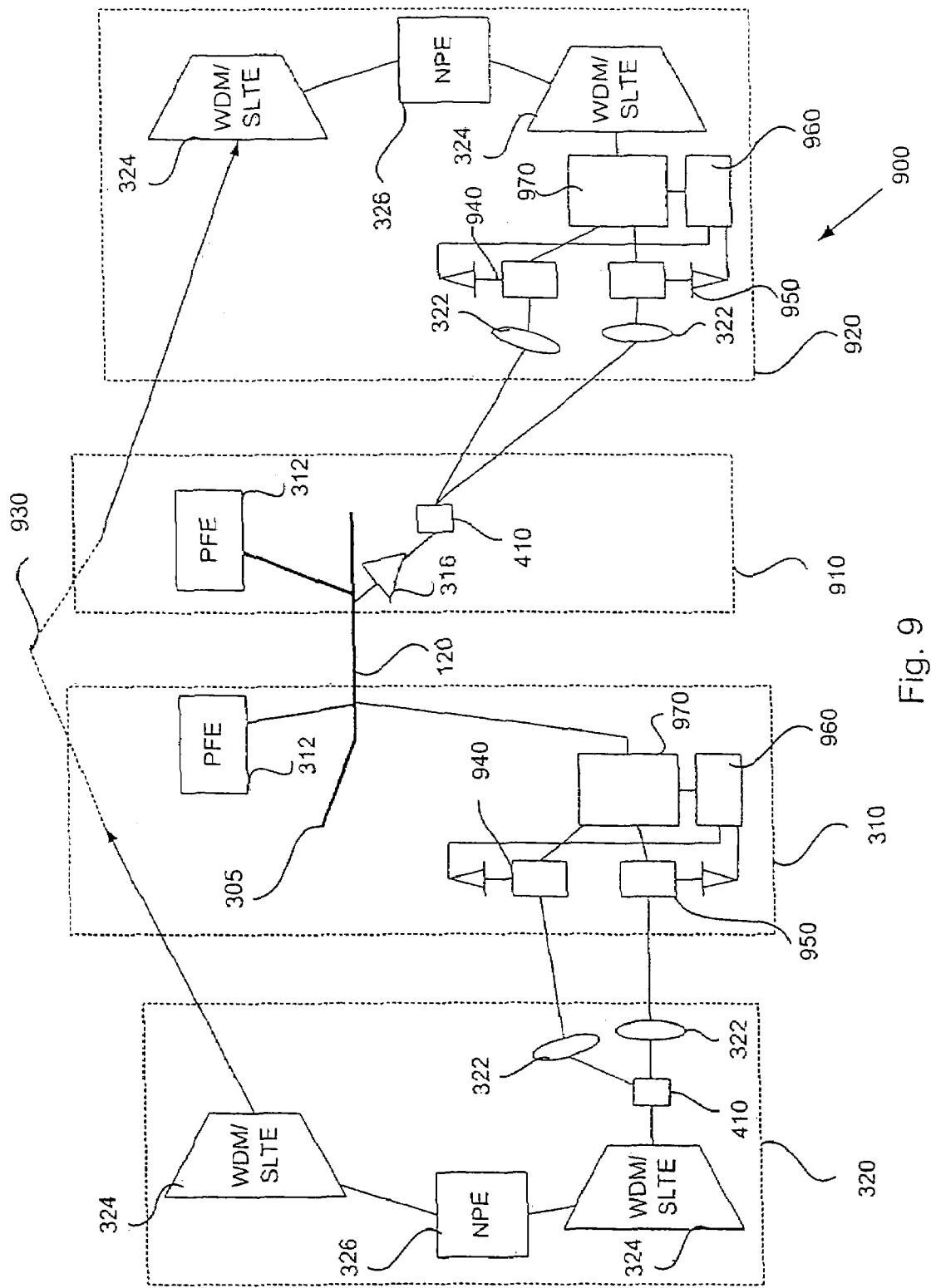
FIG. 9 is a block diagram of an exemplary optical system consistent with the principles of the present invention with an alternate undersea fiber route and sensing switches.

FIG. 9 is a block diagram of an exemplary optical system 900 with an alternate undersea fiber route and sensing switches. Optical system 900 may include a first cable landing station 310, a first POP 320, a second cable landing station 910, and a second POP 920. The first cable landing station 310 and the second cable landing station 910 may be coupled by at least first undersea optical cable 120. Each of the first and second POPs 320 and 920 includes two WDM/SLTE units 324. A diversely routed submarine cable 930 may be coupled between one of the two WDM/SLTE units 324 (hereinafter referred to as the "second WDM/SLTE unit"). The diversely routed submarine cable 930 may, or may not, be connected to the first and second cable landing stations 310 and 910, but in any case the cable 930 may be routed physically apart from the other submarine cable 120 for redundancy.

With reference to the first WDM/SLTE units 324 and their corresponding signal path through undersea cable 120, the first POP 320 and the second cable landing station 910 each includes a 3 dB 50/50 splitter 410. In this manner, system 900 incorporates 1+1 protection between the first POP 320 and the first cable station 310, as well as between the second cable station 910 and the. second POP 920.

The first cable station 310 and the second POP 920 may each include a selecting switch which may include a first 2% tap and sensing device 940, a second 2% tap and sensing device 950, a processor 960, and a 1×2 optical switch 970. Sensing devices 940 and 950 may, for example, be photodiodes or optical spectrum analyzers. This selecting switch may be used as the optical switch 430 in any of FIGS. 4-8. The processor 960 may be connected to both of the photodiodes 940/950 and to the 2:1 switch 970. The processor 960 may be configured to control the 2:1 switch 970 to pass on one of the input optical signals based on signal quality and strength measurements from the sensing devices 940/950. The processor 960 may also be configured to communicate with other portions of the system 900.

As mentioned previously, although only one transmission direction (i.e., left to right) is shown in FIG. 9, the system 900 may include fibers and optical hardware for transmission in the opposite direction. Although not shown, the second cable station 910 and the first POP 320 each may include a switch 430, and the POP 320 may include devices 940-970.

System Operation

Figure 10:
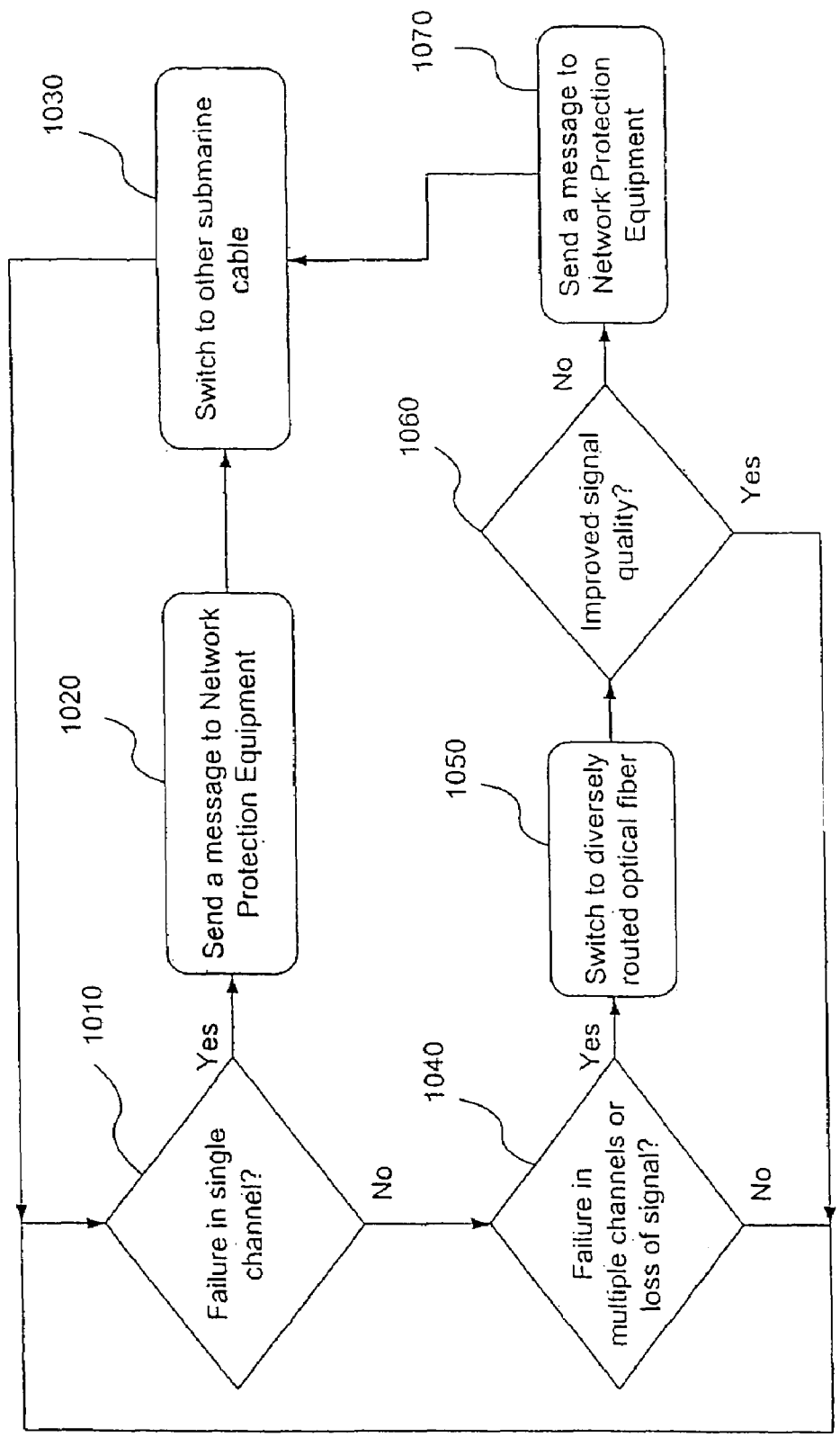
FIG. 10 is a flow chart of failure switch-over processing performed by the system of FIG. 9.

FIG. 10 is a flow chart illustrating exemplary processing performed by the optical system 900. Processing may begin with processors 960 monitoring information from the two taps and sensing devices 940 and 950. Each processor 960 may check whether the information received corresponds to an indication of failure for a single channel of information in one of the terrestrial fiber links [act 1010]. If the processor 960 detects such a failure in a single channel of information, it may wait for a predetermined time period (e.g., 10 msec to allow for self-correction), and then send an alarm to NPE 326 to indicate a single channel failure mode [act 1020]. The NPE 326 may then decide that the problem is most likely attributable to a malfunctioning transceiver in the WDM/SLTE 324 and may decide to switch the communications path to the diversely routed submarine line 930 [act 1030].

If the processors 960 do not detect failure on a single channel, they may monitor for failure on multiple channels or a loss of WDM signal in the fiber [act 1040]. If such a failure is detected, the processor 960 may command its corresponding switch 970 to change to the alternate fiber links [act 1050]. Upon waiting for a predetermined time period (i.e., roughly the amount of time that it takes to trigger the switch 970 and receive data over the other fiber) the processor 960 may again check for multiple channel failures [act 1060]. If the processor 960 continues to detect multiple channel failures, then it may send a signal to the NPE 326 [act 1070]. The NPE 326 may then determine that the submarine link 120 has been cut and switch the communications to the diversely routed submarine line 930 [act 1030]. Otherwise, if switching to the backup terrestrial fiber eliminates the errors, then the corresponding processor 960 can signal the NPE 326 of this information in act 1070. In such a case, the NPE 326 may then initiate processes (e.g., coherent optical time domain reflectometry (COTDR)) to locate the failure in the identified terrestrial link.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, though amplifiers 316 and dispersion compensating fibers (DCF) 322 have been shown at various points in the figures, those skilled in the art will appreciate that more or fewer amplifiers 316 and/or DCFs 322 may be used at possibly different locations within the various systems 300-900 according to requirements and design constraints for these systems. Further, although one or two POPs are shown for ease of explanation, those skilled in the art will appreciate that more or fewer than two POPs may send and receive signals to and from a single cable station. Those skilled in the art will use suitable numbers and types of splitters and switches to provide for additional POPs.

Further, the acts in FIG. 10 need not be implemented in the order shown, nor do all of the acts need to be performed. Moreover, well-known schemes for providing transient protection may be incorporated in the systems and methods described herein by those skilled in the art. One example of such well-known transient protection schemes may include providing optical signal energy during switching events by using a separate laser source with feedback.

Fault Protection Architectures

Figure 11:
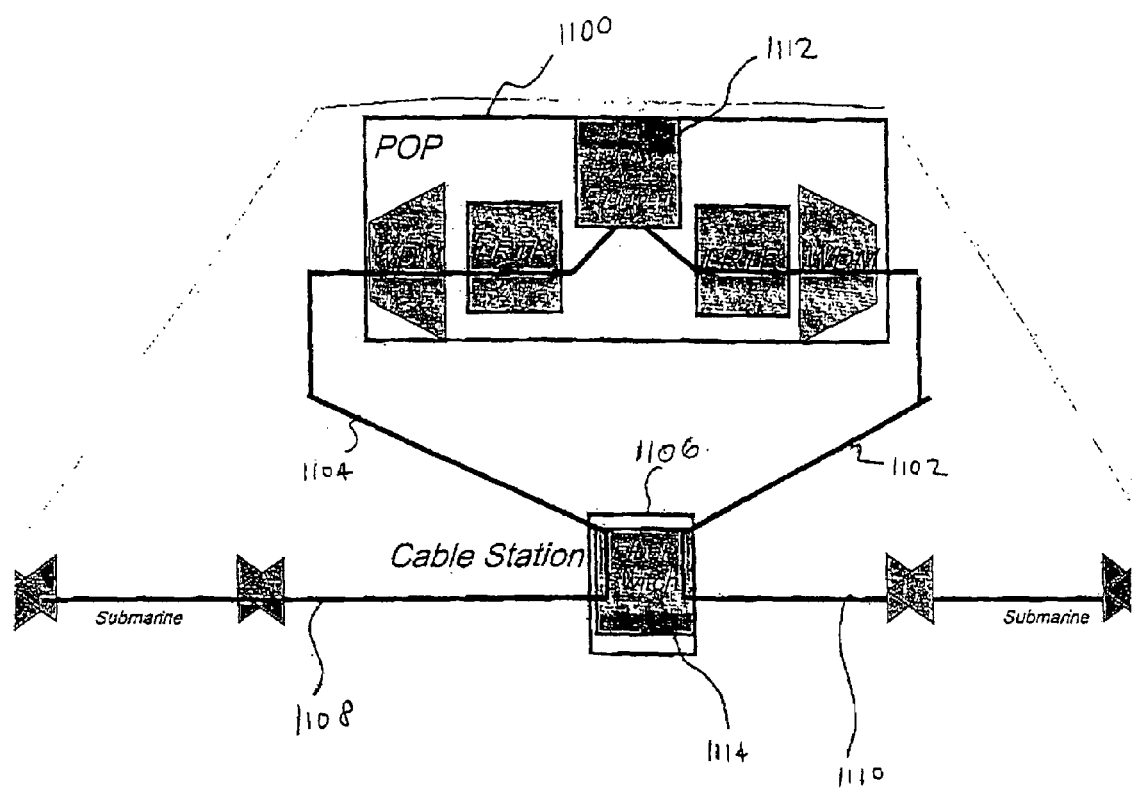
FIG. 11 is a block diagram illustrating a single node fault protection architecture consistent with the principles of the present invention.

As mentioned above, it would also be desirable to use the foregoing architectures while at the same time providing protection for multiple faults in either the submarine or terrestrial networks. FIG. 11 depicts an architecture according to the present invention, wherein the POP 1100 associated with the terrestrial backhaul system (not shown) is connected to the submarine system by way of two diversely routed, WDM fiber optic connections 1102 and 1104 to the cable landing station 1106. Although shown using an example connecting a terrestrial optical communication system with a submarine optical communication system, those skilled in the art will appreciate that this architecture can also be used to connect two 1+1 submarine rings or two 1+1 terrestrial rings.

Repeaters (amplifiers) can be provided along links 1102 and 1104 as needed depending upon the distance between the cable landing station 1106 and the POP 1100. The cable landing station 1106 is likewise connected to the submarine ring network, represented by links 1108 and 1110. To provide two diversely routed WDM connections between the POP 1100 and the cable landing station 1106, the POP also includes two sets of transmit equipment (LRTRs, WDM), each of which are connected to an optical switch or other access device 1112 and then to the terrestrial backhaul.

The cable landing station 1106 will include a fiber switch 1114 that enables fault protection according to this exemplary embodiment of the present invention. Although not shown in FIG. 11, the cable landing station 1 106 may also include other equipment for processing optical signals transmitted on the links 1102, 1104, 1108 and 1110, e.g., as described above with respect to FIGS. 1-10. The fiber switch 1114 can also provide dispersion compensation, e.g., using suitable lengths of positive or negative dispersion optical fiber, and amplification along each path. Amplification to the working and protection path in the fiber switch 1114 can be performed using separate boards/shelves to avoid single path failures.

Figure 12:
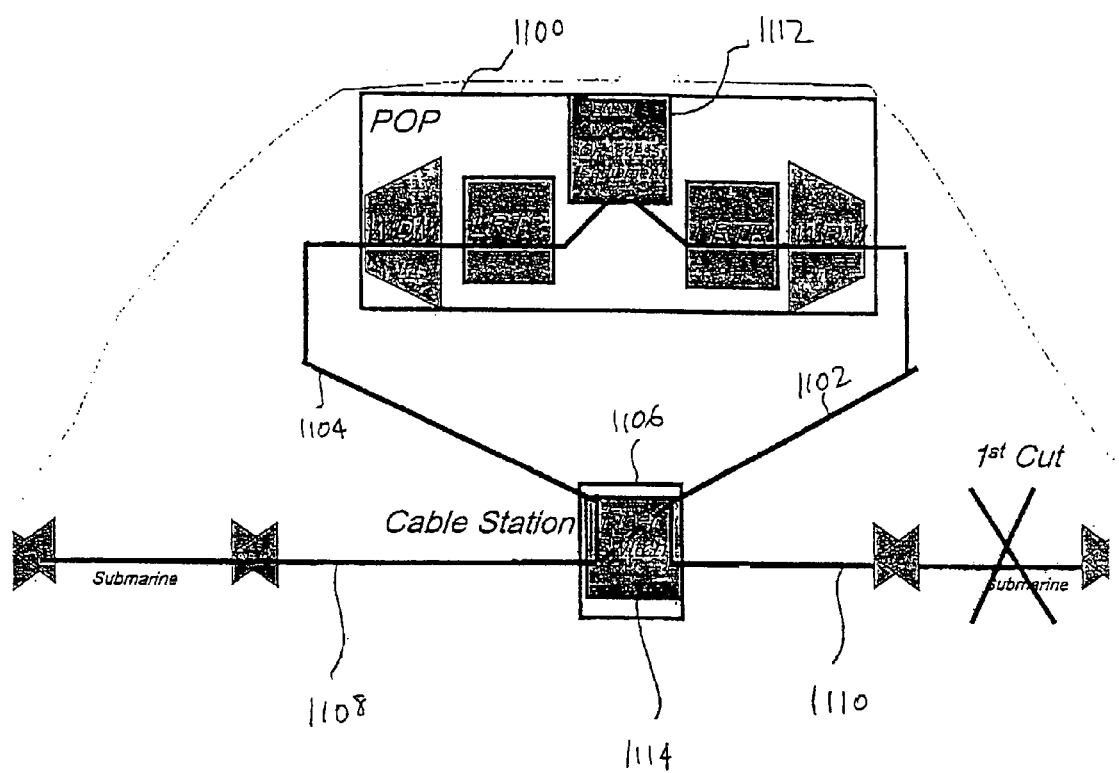
FIGS. 12 and 13 are block diagrams illustrating fiber switch reconfiguration in response to various fiber cuts consistent with the principles of the present invention.

During normal operation, i.e., without any fiber cuts, the fiber switch 1114 will be in the state shown in FIG. 11 such that the two paths around the ring (working path and protect path) are extended to the POP 1100 along two diverse paths. However when, for example, a fiber cut occurs in link 1110 as shown in FIG. 12, then the fiber switch can be reconfigured to provide bridging in the transmit direction from the submarine link 1108 to the POP 1100 and protection switching in the receive direction from the POP 1100 to the submarine link 1108. This enables those WDM optical data signals traveling over the submarine link 1108 to continue to benefit from the path diversity between the cable station 1106 and the POP 1100 even after the fiber cut occurs in submarine link 1110. WDM signal bridging can be provided by, for example, splitting the signal received at cable station 1106 from submarine link 1108 and providing the split signal to both links 1102 and 1104. This functionality can be provided using optical splitters combined with 0×1 on/off optical switches or broadband optical switches.

Figure 13:
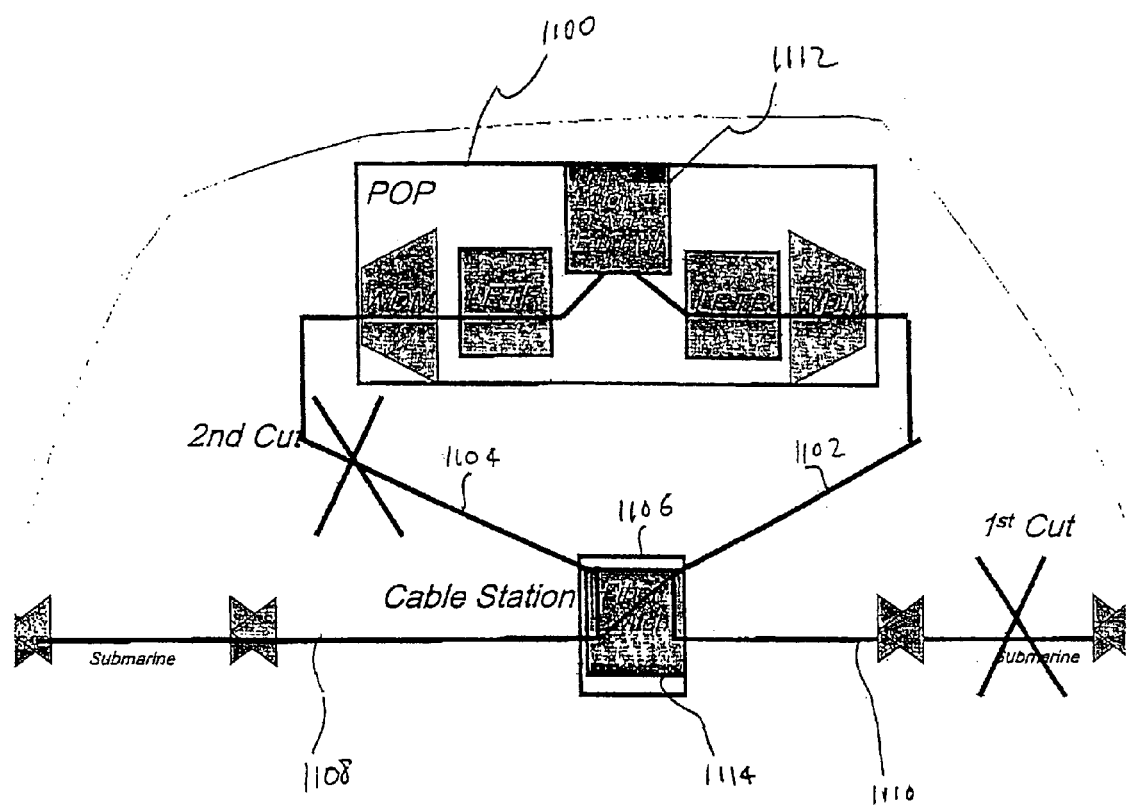

If a second fiber cut occurs, e.g., in link 1104 between the POP 1100 and the cable landing station 1106, then the fiber switch 1114 is configured to connect links 1102 and 1108 as seen in FIG. 13. Channel level switches, in device 1112, provide protection in the transmit direction from submarine link 1108 to the terrestrial backhaul system.

Figure 14:
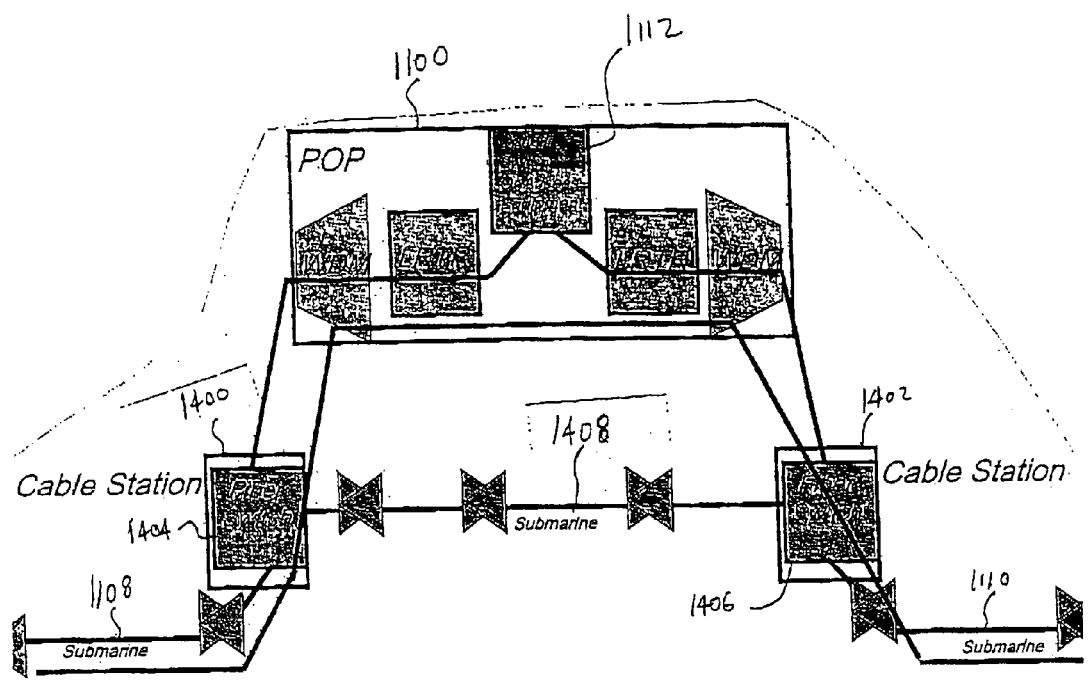
FIG. 14 is a block diagram illustrating a dual node fault protection architecture consistent with the principles of the present invention.

Another fault protection architecture according to the present invention is illustrated in FIG. 14. In this dual node configuration, two cable landing stations 1400 and 1402 (and respective fiber switches 1404 and 1406) are provided to interconnect the 1+1 submarine ring with the 1+1 terrestrial system. A submarine link 1408 connects the two cable landing stations 1400 and 1402 to provide a shared transit link during periods of switch reconfiguration. This exemplary embodiment provides additional failure protection and cable landing station (fiber switch) redundancy.

The foregoing fault protection architecture embodiments of FIGS. 11-14 enable multiple fiber cuts to be readily handled. When a fiber cut, or other failure, is corrected, then the system can be placed back into its normal operational state. Reconfiguration and subsequent clearing of the fiber switch(es) can be operator initiated or automatic. Passthrough wavelengths, i.e., channels that pass through a node without electrical termination, can also be provided through the cable landing station(s) and POP(s).

Figure 15:
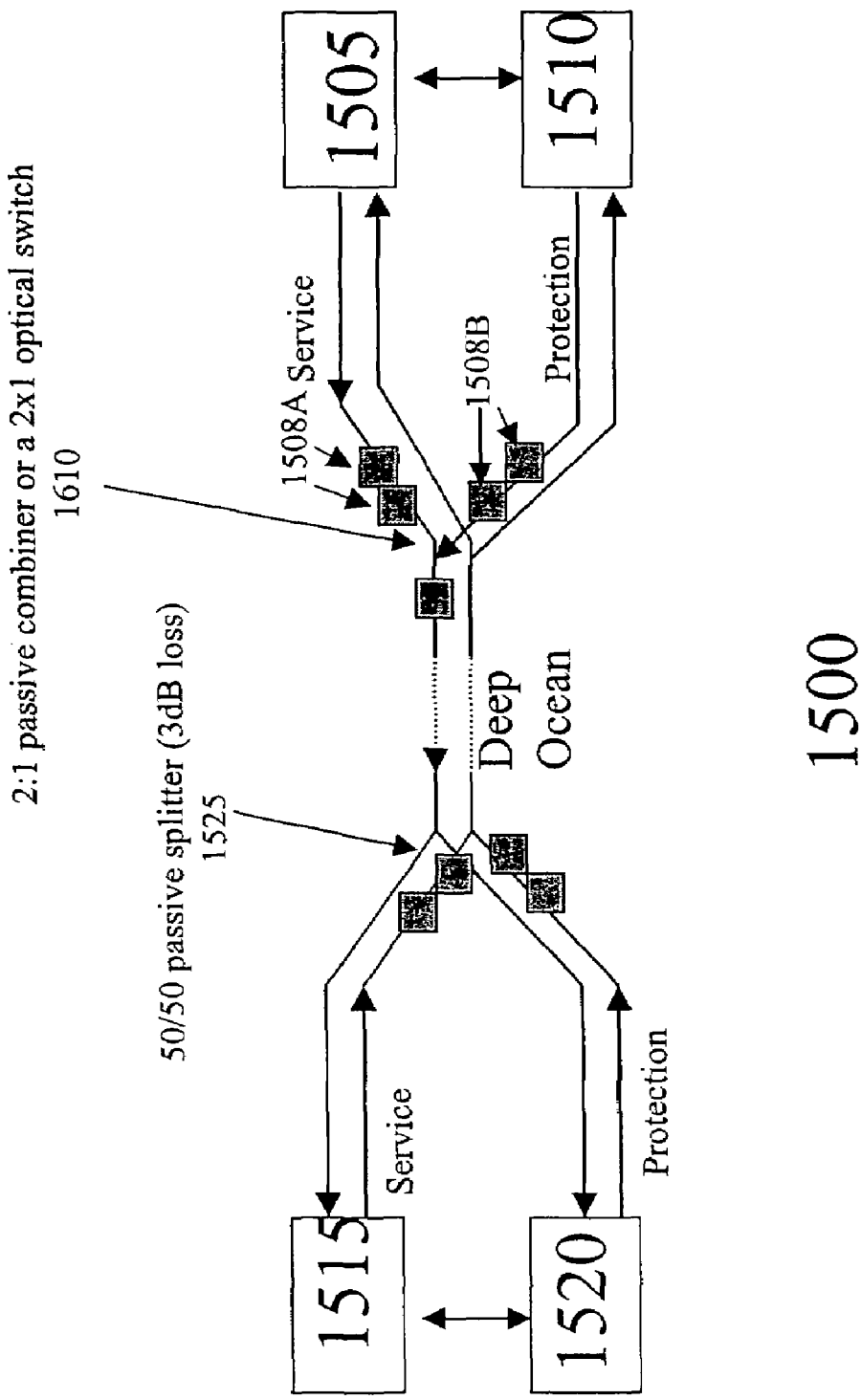
FIG. 15 is a block diagram of a fiber optic system in which a branch unit according to the invention may be used, in which a 2:1 passive combiner is provided in the branch unit and a 50/50 passive splitter is provided in the branch unit in a fiber optic architecture.

Another embodiment of the present invention includes a service transmission optical line and a protection transmission optical line. Referring to FIG. 15, which shows the basic architecture of a fiber cut protection system in which a branch unit according to the invention may be utilized. A service transmission optical line is coupled to a first line terminating equipment 1505, and a protection transmission optical line is coupled to a second line terminating equipment 1510. The same data is provided on both the service transmission optical line and the protection transmission optical line. The first and second line terminating equipment can be provided at a first location or connected by optical fiber of the fiber optic system.

The service transmission optical line is provided on a first optical branch (also called first branch path), and the protection transmission optical line is provided on a second optical branch (also called second branch path). The signals received from the first and second optical branches are combined at a combiner 1710. The combiner 1710 outputs a combined signal onto a main optical path. At least one line unit 1508A is provided on the first branch path between the first line terminating equipment 1505 and the combiner 1710, and at least one line unit 1508B is provided on the second branch path between the second line terminating equipment 1510 and the combiner 1710. The first and second branch paths are preferably provided in regions where there is a high probability of fiber cuts (e.g., shallow water regions or urban land regions) in which the fiber optic system is laid.

Each of the line units 1508A, 1508B on the first and second branch paths respectively, as well as on the main optical path, has at least one pump laser, which can be set to a power level from zero to a maximum value. The line units operate as repeaters for receiving an optical signal and for outputting an optical signal that has the same information content as the received optical signal, but with increased signal strength to account for any signal attenuation between adjacent line units. Under normal operating conditions, at least one of the line units 1508B on the second branch path has its respective pump laser set to a zero or near-zero power output state, and all of the line units 1508A on the first branch path have their respective pump lasers set to a normal power output state. Under normal operating conditions, the last few line units, such as the last one to four line units on the second branch path that are directly upstream of the branch unit, which itself may operate as a line unit, preferably have their respective pump lasers set to the zero or near-zero power output state to reduce spontaneous noise and prevent the secondary signal from interfering with the primary signal.

Figure 16:
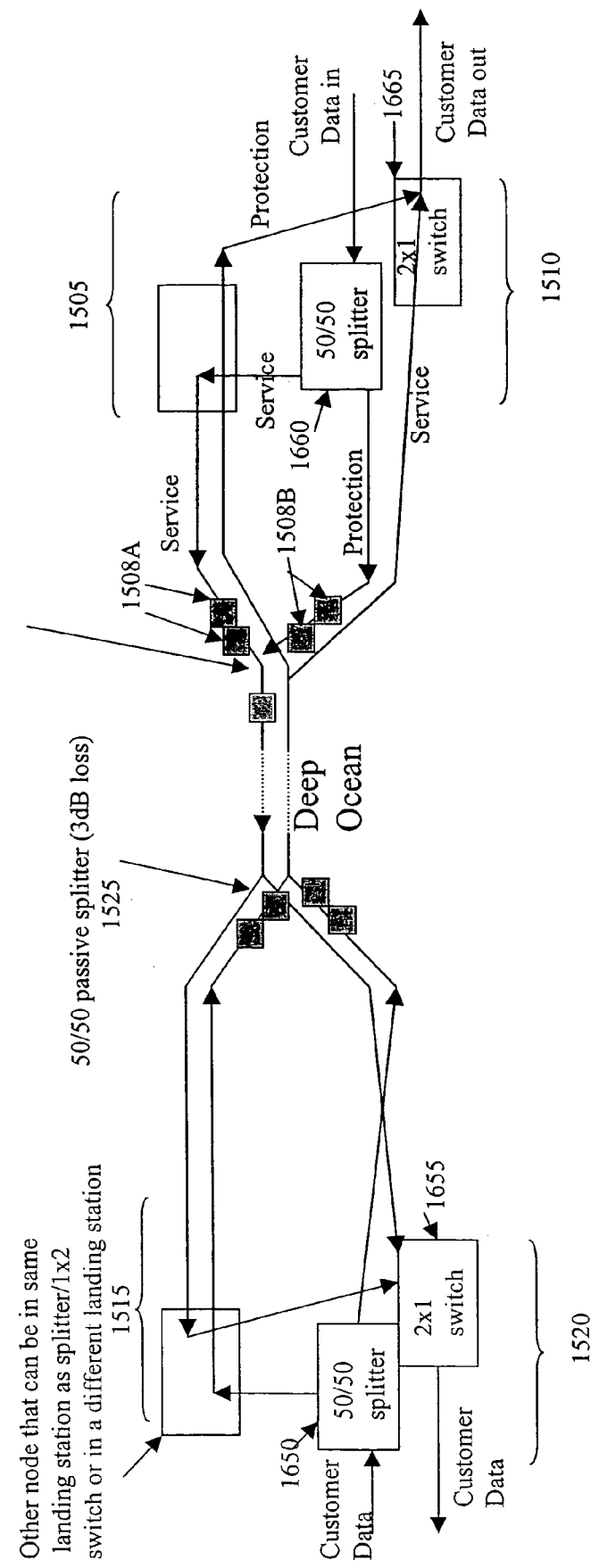
FIG. 16 is a block diagram of a fiber optic system in which a branch unit according to the invention may be used, in which a split redundant trunk architecture is diagramed in greater detail.

FIG. 16 shows more details of the fiber optic system. In FIG. 16, the fiber-bays may comprise a variety of devices to accommodate customer interface and signal transmission. Fiber-bay 1520 is shown with a 50/50 splitter 1650 and a 2×1 switch 1655. Similarly, fiber-bay 1510 is shown with a 50/50 splitter 1660 and a 2×1 switch 1665. As customer data to-be-transmitted enters fiber-bay 1520, the 50/50 splitter 1650 sends data to fiber-bay 1515 to be sent down the service transmit path. The splitter 1650 also sends data down the protection transmit path. Fiber-bay 1510 then uses the 2×1 switch 1665 to select the service path or the protection path for data received at fiber-bay 1510.

Similarly, customer data to-be-transmitted that enters fiber-bay 1510 is split by the 50/50 splitter 1660 and sent to fiber-bay 1505 to be sent down the service transmit path. The splitter 1660 also sends data down the protection transmit path. Fiber-bay 1520 then uses 2×1 switch 1655 to select the service path or the protection path for data received at the fiber-bay 1520. In this configuration the customer does not need to actively select between the service and protection paths due to the branch units or terminal switch performing that function.

In more detail, for a branch unit according to the first embodiment which utilizes a passive combiner, when the service path is not operating normally, as detected by a detector provided at the output of the combiner (see FIG. 17, for example), then the last few pump amplifiers of the line units in the protection path are set to provide a normal power output (somewhere between minimum and maximum power output capability), to provide the backup signal to the combiner to make up for the system problem in the service path.

Figure 17:
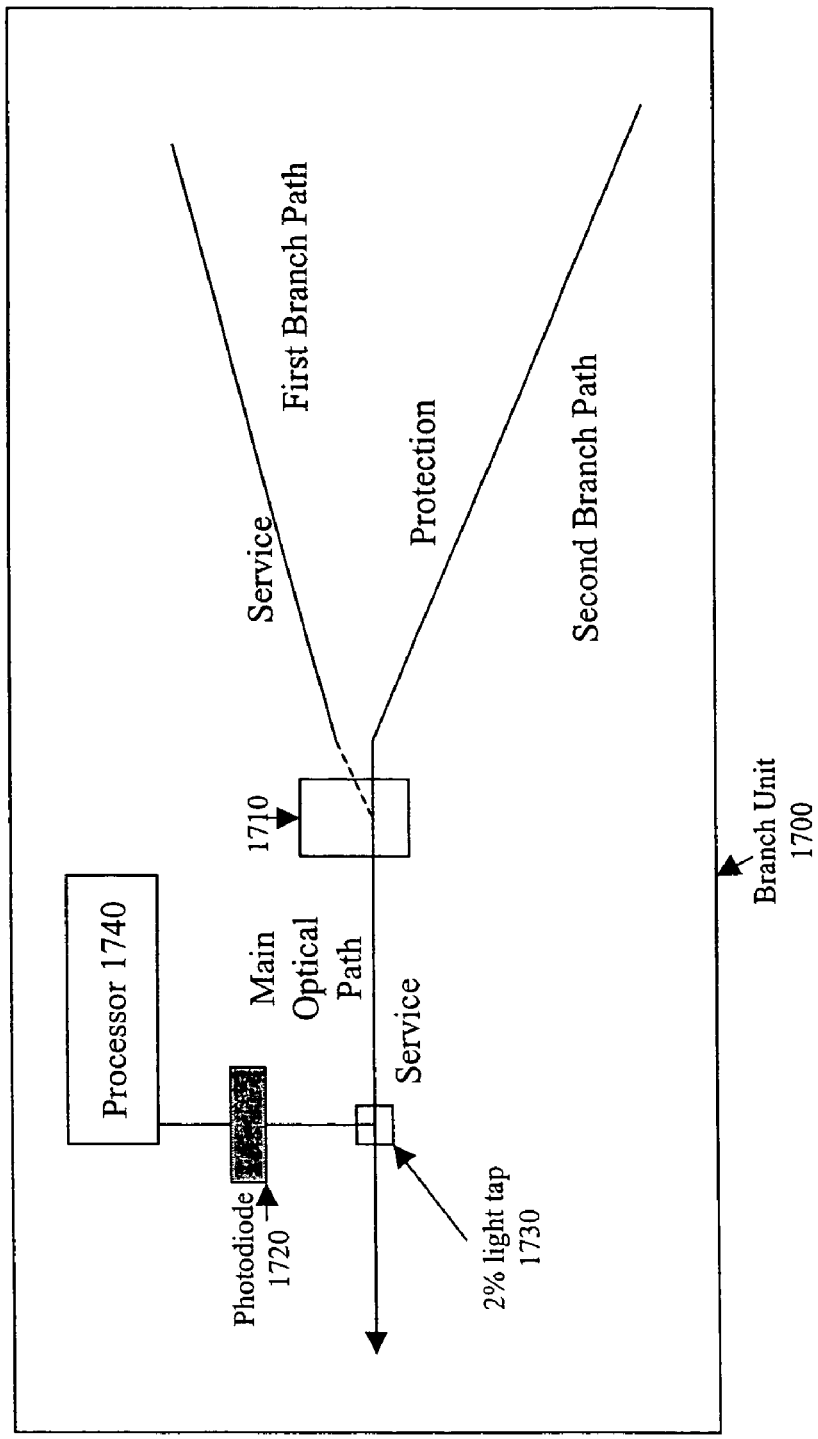
FIG. 17 is a block diagram of a branch unit according to a first embodiment of the invention.

The first and second branch paths meet each other at a branch unit to form the beginning portion of the main optical path. Referring to FIG. 17, which shows a first embodiment of the invention, the branch unit 1700 includes a combiner 1710, which is preferably a 2×1 passive combiner. The combiner combines the signals received on the first and second optical branch paths and outputs the combined signal onto the main optical path.

A detector, which is shown as a photodiode 1720, is provided at the output of the combiner 1710. The photodiode 1720 receives a signal corresponding to 2% of the output of the combiner 1710, by way of a light tap 1730 (e.g., splitter) placed at the output of the combiner 1710. Of course, other tap amounts may be utilized while remaining within the scope of the invention, such as a 1% to 5% tap. When the output signal is below a threshold level, as determined by a processor 1740 that receives information supplied to it from the photodiode 1720, it is determined that there is a problem on the first branch path. The commands to switch between service and protection paths may also come from the end nodes (if the problem exists at the end nodes), although there will be propagation delays in that instance. This problem may be that there is no signal, thereby signifying a fiber cut (or a problem at the end nodes). In that case, all of the line units 1508B on the second branch path are instructed to set the power level of their respective pump lasers to a normal power output state, so that the combiner 1710 receives the backup signals output from the second branch path.

In a normal operation mode, the signals on the second branch path are normally attenuated on the second branch path, and thus are either not provided to the combiner 1710 or are provided to the combiner 1710 at a very low signal strength. However, when a problem with the first branch path is detected due to a low level signal or no signal detected at the output of the combiner 1710, then the signals from the second branch path are provided to the combiner 1710 at an increased power level by increasing the power level of the last one to four line units 1508B on the second branch path. The power level of these line units is increased from a zero or non-zero power output state to a normal power output state. At the same time, one or more line units 1508A on the first branch path may have their laser units set to output a zero or near-zero power output. This is done to ensure that any noise received on the corrupted first branch path does not corrupt the reception of the protection signal (on the second branch path) by the combiner 1710.

Once the problem on the first branch path has been corrected, then the system can return back to its normal operating condition. The problem on the first branch path may be, for example, a cut on the fiber optical line somewhere on the first branch path. This cut may have been caused by an anchor or fishing trawler causing damage to a fiber optic cable that is placed at a shallow water region of a body of water. Alternatively, for fiber optic cable laid on land, the damage may be due to ground digging that inadvertently cuts a fiber optic cable at an urban construction site. During the time when the first branch path is being repaired, the end of the first branch path provided to the branch unit is preferably coupled to a high voltage switch (not shown) at the branch unit, so as to short that path to ground. This provides protection for workers who are repairing the first branch path. After the repair is complete, the first branch path is decoupled from the high voltage switch.

The signal output by the combiner 1710 on the main optical path travels along the entire distance of the main optical path from a first region where there is a high probability of fiber cuts (e.g., Lisbon harbor or Baltimore City) to a second region where there is a high probability of fiber cuts (e.g., New York harbor or New York City). The main optical path is laid on a third region where there is a low probability of fiber cuts, such as a deep water region (e.g., Atlantic Ocean or Pacific Ocean, or a rural land region).

At the far end of the main optical path, the signal from the first optical path is split, by way of a splitter, onto a third branch path and a fourth branch path. The signals on the third and fourth branch paths are equal to each other and are 3 dB less in signal strength than the signal on the first optical path. The splitter is preferably a 50/50 passive splitter (3 dB loss), and preferably has minimal wavelength dependence (a flattening filter may be utilized with the splitter if it has some degree of wavelength dependence). FIG. 15 shows a splitter 1525 that provides an identical signal to a third line terminal equipment 1515 and to a fourth line terminating equipment 1520. The splitter 1525 duplicates the optical fiber such that a cut in either of the duplicated fibers does not result in a loss of half the bandwidth of the split fiber, as opposed to a conventional system that splices the fiber in half, such that a cut in either of the spliced fibers results in a loss of half of the bandwidth of the split fiber.

There is provided at least one line unit on the third branch path, between the splitter 1525 and the third line terminating equipment 1515, and there is also provided at least one line unit on the fourth branch path, between the splitter 1525 and the fourth line terminating equipment 1520. The third line terminating equipment 1515 and the fourth line terminating equipment 1520 are provided at a second location of the fiber optic system. In a normal mode of operation, signals received by the third line terminating equipment 1515 are utilized at the receive end, and the signals received by the fourth line terminating equipment 1520 can be passed to the third line termination equipment 1515. When the third line terminating equipment 1515 determines that there is a failure on the third branch path, such as a fiber cut, the system is switched so as to utilize the signals received by the fourth line terminating equipment 1520 on the fourth branch path. The third and fourth line termination equipment 1515, 1520 can be joined by WDM fibers and repeaters, such as in a standard 1+1 or unidirectional path switched ring architecture (UPSR).

A similar protection path and service path exists for signals traveling in the opposite direction from the second location to the first location of the fiber optical system. FIG. 15 shows the paths in both directions, between the first and second line terminating equipment 1505, 1510 at the first location, and the third and fourth line terminating equipment 1515, 1520 at the second location.

Figure 18:
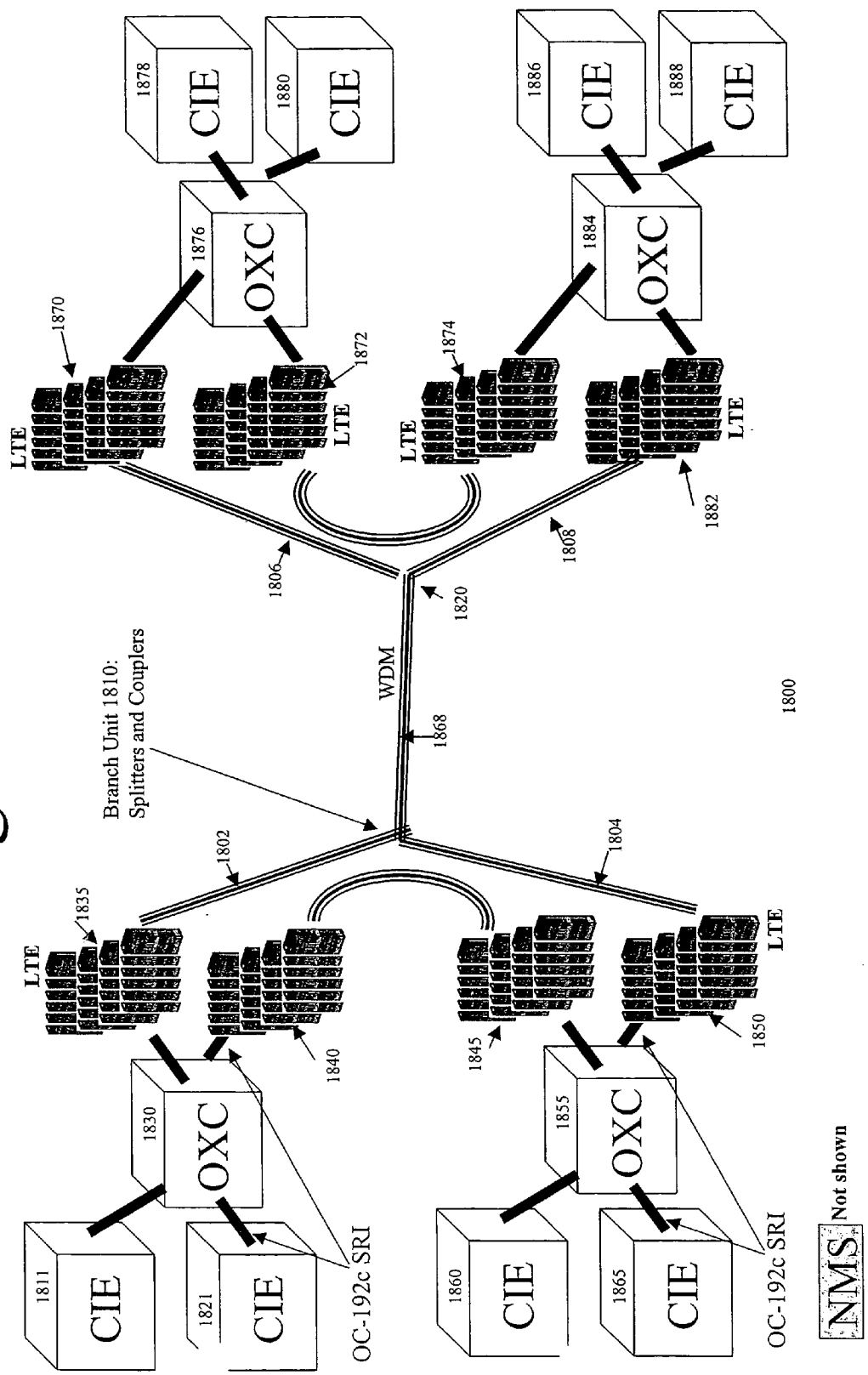
FIG. 18 is a diagram of a split redundant trunk in a multi-node ring configuration, according to any of the embodiments of the invention.
Figure 19:
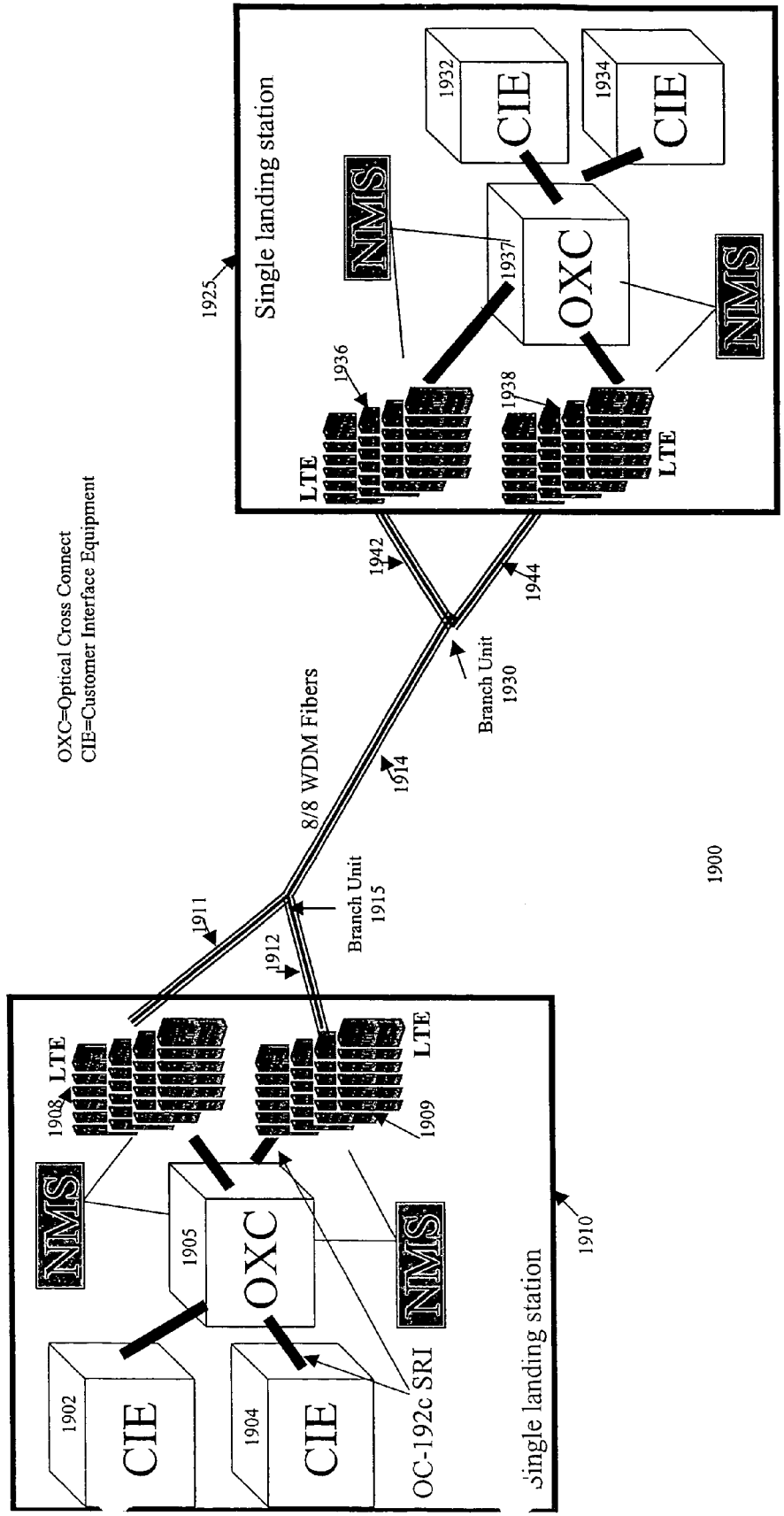
FIG. 19 is a diagram of a point-to-point split redundant trunk configuration, according to any of the embodiments of the invention.

The basic architecture of a split redundant trunk structure 1500 in which a branch unit (see FIG. 17, for example) according to the present invention may be utilized is shown in FIG. 15 and FIG. 16. The architecture of FIG. 15 and FIG. 16 can be implemented for either a multi-node ring configuration or a point-to-point configuration, as shown in FIGS. 18 and 19, respectively. This architecture is suitable for submarine networks where the collapsed portion in the center of the architecture is in the deep ocean where it is extremely rare to have a fiber cut in that region. Alternatively, this architecture is suitable for land-based networks where part of the network is laid out in urban regions (in which much building and road construction typically takes place) and where other parts of the network are laid out in rural or suburban regions (in which less building and road construction typically takes place). Regardless of the application, a customer interface to this architecture will generally not distinguish between a standard architecture and a split redundant trunk structure according to the present invention.

In the multi-node ring configuration 1800 as shown in FIG. 18, first and second customer interface equipment (CIE) 1811, 1821 are coupled to a first optical cross-connect unit (OXC) 1830 at a first location. The first OXC 1830 is coupled to a first set of fiber-bays 1835 and a second set of fiber-bays 1840. All connections to the first OXC 1830 are preferably OC-192c SRI fiber optic connections. The first set of fiber-bays 1835 is coupled to a first optical branch path 1802, and the second set of fiber-bays 1840 is coupled to a third set of fiber-bays 1845 via control fiber optic lines. Signals from fiber-bays to fiber-bays are typically WDM.

There are also a fourth set of fiber-bays 1850, which are coupled to a second optical branch path 1804. Both the third set of fiber-bays 1845 and the fourth set of fiber-bays 1850 are coupled to a second OXC 1855, whereby the second OXC 1855 is coupled to third and fourth CIEs 1860, 1865. The first and second optical branch paths 1802, 1804 are preferably 8 transmit/8 receive wavelength division multiplexed (WDM) optical fibers.

The first and second optical branch paths 1802, 1804 are coupled to a main optical path 1868 via a first branch unit 1810, which includes splitters and couplers (not shown in FIG. 18). The splitters split signals received from a main optical path 1868, and provide the split signals on respective service paths and protection paths of the first and second optical branch paths 1802 and 1804. The couplers couple signals from the respective service and protection paths, to be sent out over the main optical path 1868. Like the first embodiment, the first and second optical branch paths 1802, 1804 are provided at a first shallow water region (or a first land region where there is a high probability of a fiber cut) in which the multi-node ring configuration is disposed.

The main optical path 1868 travels along a deep water region (or a land region where there is a low probability of a fiber cut), such as an ocean floor (or a rural land area), and makes its way to a second shallow water region (or a second land region where there is a high probability of a fiber cut) at which a second branch unit 1820 couples the main optical path 1868 to third and fourth optical branch paths 1806, 1808. The second branch unit 1820 includes splitters and couplers (not shown in FIG. 18). The splitters split a signal sent from one of the first through fourth CIEs onto a service path and a protection path. The couplers couple signals received on the third and fourth optical branch paths 1806 and 1808, which are destined for one or more of the first through fourth CIEs, to provide the coupled signal onto the main optical path 1868.

A fifth set of fiber-bays 1870 are coupled to the third optical branch path 1806, and a sixth set of fiber-bays 1872 are coupled to a seventh set of fiber-bays 1874. The coupling of the sixth and seventh sets of fiber-bays may be via fiber optic control lines. The fifth and sixth sets of fiber-bays 1870, 1872 are coupled to a third OXC 1876. The third OXC 1876 is coupled to fifth and sixth CIEs 1878, 1880.

There is also provided an eighth set of fiber-bays 1882, which is coupled to the fourth optical branch path 1808. The seventh and eighth sets of fiber-bays 1874, 1882 are coupled to a fourth OXC 1884. The fourth OXC 1884 is coupled to seventh and eighth CIEs 1886, 1888.

In the point-to-point collapsed ring architecture 1900 shown in FIG. 19, a first landing station 1910 is shown, which includes first and second CIEs 1902, 1904, a first OXC 1905 coupled to the first and second CIEs 1902 and 1904 and to first and second sets of fiber-bays 1908 and 1909. The first set of fiber-bays 1908 is coupled to a first optical branch path 1911, and the second set of fiber-bays 1909 is coupled to a second optical branch path 1912. The first optical branch path 1911 includes 8/8 WDM fibers, which route service signals, and the second optical branch path 1912 includes 8/8 WDM fibers, which route protection (or backup) signals. The 8/8 WDM can take on other arrangements such as 6/6, 4/4, 2/2 and other arrangements as would be readily apparent to one skilled in the art.

The first and second optical branch paths 1911, 1912 meet up with each other at a first branch unit 1915, which includes splitters and couplers (not shown in FIG. 19), to couple the branch paths to a main optical path 1914. The main optical path 1914 is a fiber optical path that is located at a deep water region or rural land region, for which redundancy is not needed due to a small likelihood of fiber cuts occurring in these regions.

Also shown in FIG. 19 is a second landing station 1925, which includes third and fourth CIEs 1932, 1934, a second OXC 1937 coupled to the third and fourth CIEs 1932, 1934 and to third and fourth sets of fiber-bays 1936, 1938. The third set of fiber-bays 436 is coupled to a third optical branch path 1942, and the fourth set of fiber-bays 1938 is coupled to a fourth optical branch path 1944. The third optical branch path 1942 preferably includes 8/8 WDM fibers, which route service signals, and the fourth optical branch 1944 path preferably includes 8/8 WDM fibers, which route protection or backup signals. The third and fourth optical branch paths 1942, 1944 are coupled to the main optical path 1914 by way of branch unit 1930.

In the first embodiment of a branch unit, such as shown in FIG. 17, the processor 1740 of the branch unit receives the output of the photodiode detector 1720, and makes a determination as to whether or not the service path is operating normally. If the processor determines that the service path is not operating normally, then the processor sends control signals to at least one of the last few line units on the second branch path (protection path), to instruct those line units to increase their power output levels to a normal power output state. This may require communicating to the terminal, followed by the terminal communicating to the line units. The sending of control signals from the processor to the upstream line units is typically performed via the same fiber optic lines used for the optical signal through modulation of the signal or through an additional channel wavelength. Alternatively, the processor may notify a network management system (NMS in FIGS. 18 and 19), which provides control over the entire fiber optic system. When a failure on the protection path is determined, the last few line units on the second branch path are instructed to increase their power output levels, to provide the backup signal at an increased power level on the second branch path to the combiner when the primary signal on the first branch path is not received at the combiner due to some fault on the first branch path.

In the first embodiment of the branch unit, the protection and service fibers are preferably split evenly between each pair of shallow water legs (e.g., 4/4 restoration and 4/4 service fibers for each 8/8 fiber leg), to ensure that there is always a communications path to land. The receiving end can be treated as a 1+1 (or unidirectional path switched ring) by the network protection system, with switchover provided when a fiber failure is detected. That is, if no signal is received by the third line terminating equipment 1515 which is supposed to receive the optical signal on the receive service line, then the system changes over to provide signals received by the fourth line terminating equipment 1520 to the system at the receive end.

Figure 20:
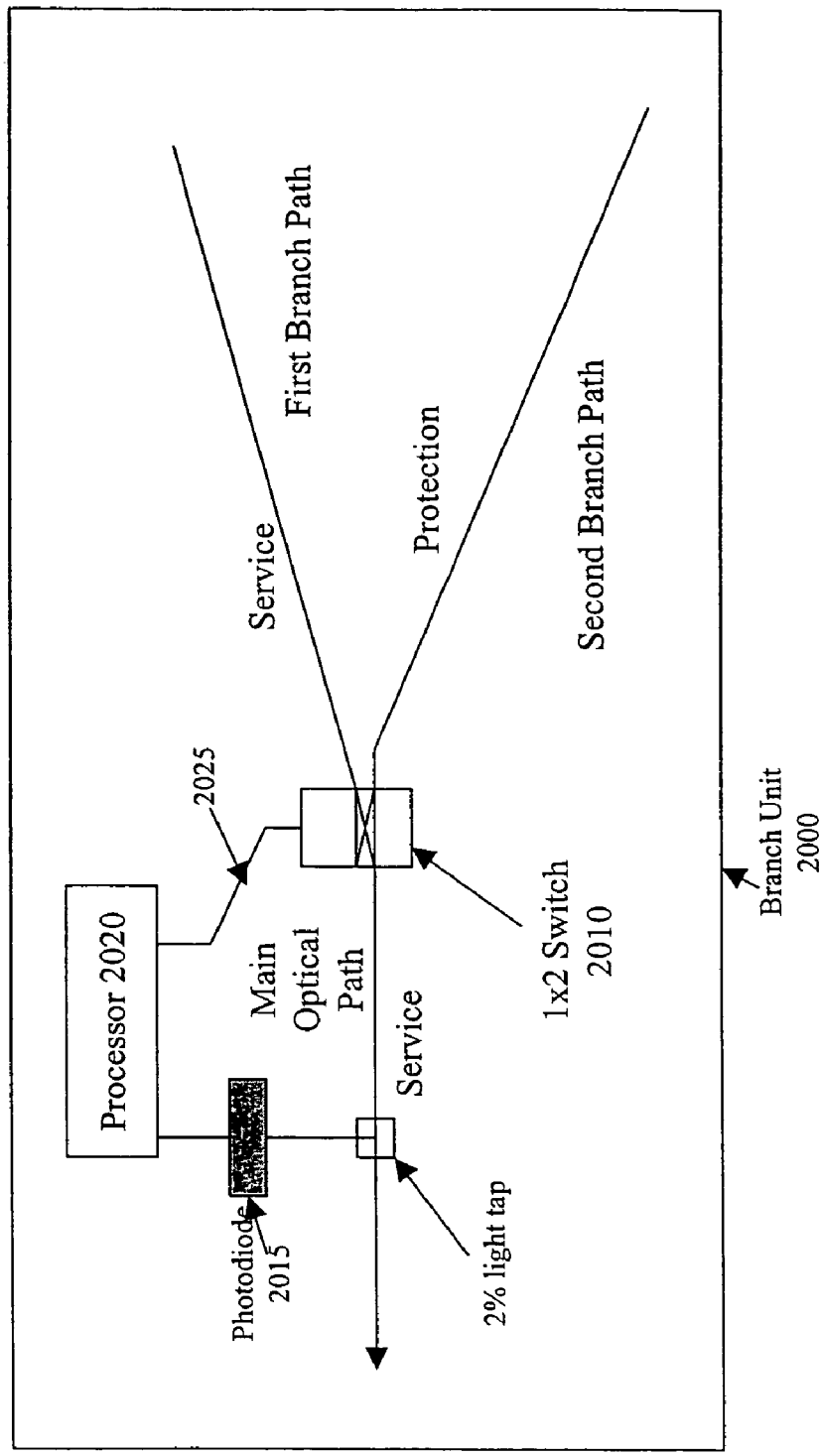
FIG. 20 is a block diagram of a branch unit according to a second embodiment of the invention, which includes a 1×2 switch instead of a passive combiner.

FIG. 20 shows a branch unit 2000 according to a second embodiment of the invention, in which a switch, shown as a 1×2 switch 2010, is utilized in the branch unit 2000. Under normal operation, the 1×2 switch 2010 is operative to provide the service signal, received at a first input port of the 1×2 switch 2010, to the output port of the 1×2 switch 2010, where the output port corresponds to the beginning of the main optical path. The 1×2 switch 2010 is preferably an ultra-high reliability switch. When a photodetector 2015 detects no signal for at least a fixed period of time, which indicates a problem (e.g., fiber cut) on the first branch path, a processor 2020 receives this information, and instructs the 1×2 switch (via control line 2025) to switch to provide the protection signal, received on the second input port of the 1×2 switch, to the output port of the 1×2 switch. In the second embodiment, there is no need to have the last few line units of the second branch path set to a zero or low-power output state under normal operating conditions, since there is no issue with respect to interference between signals received by the 1×2 switch on its two separate input ports. That is, in the second embodiment, all of the line units 1508A, 1508B on the first and second branch paths have their respective pump amplifiers in the line units always set to a normal power output state under normal operating conditions.

For both the first and the second embodiments of a branch unit described herein, failure of a service path detected by the photodiode is very fast since there are few if any propagation delays, and thus the processor can be notified of a problem on a service path very fast and command a switch to a protection path. Reconfiguration times of substantially less than a few milliseconds can be achieved from first detection of a failure on a service path, to switching to an appropriate protection path in the second embodiment. In the first embodiment, reconfiguration times under 100 milliseconds can be achieved where extra time is needed for the line units in the protection path to boost their pump amplifier power levels after being controlled to do so by either the NMS or the branch unit directly. Thus, 1+1 and UPSR protection for the receiving end at the landing station can be done transparently to the branch switching by inserting a small delay, also a few milliseconds, which requires waiting after alarms in a channel for that duration before channel level (or fiber level) switch over at the landing station.

Figure 21:
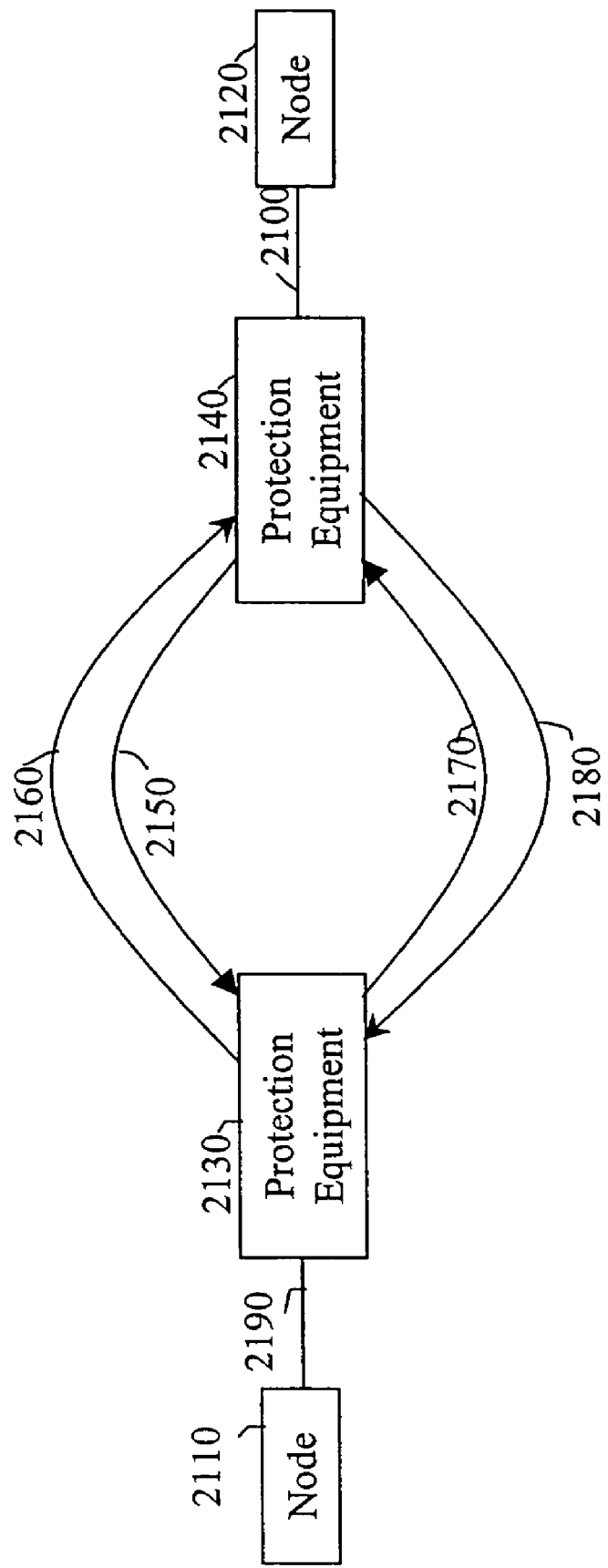
FIG. 21 is a block diagram of a network connection according to the present invention.

An example of a network connection according to another embodiment of the present invention is shown by the block diagram of FIG. 21. Nodes 2110 and 2120 may be transmitting and receiving nodes separated by a body of water. For example, node 2110 may be a node located in Paris, France and node 2120 may be a node located in New York, N.Y. Node 2110 is optically connected to protection equipment 2130 via optical fiber 2190. Similarly, node 2120 is optically connected to protection equipment 2140 via optical fiber 2100.

In a first transmit operation mode, node 2110 transmits data to node 2120 via service transmit optical fiber 2160. In a second transmit operation mode, when a fiber cut in service transmit optical fiber 2160 occurs, node 2110 transmits data to node 2120 via protect transmit optical fiber 2170.

In a first receive operation mode, node 2110 receives data from node 2120 via service receive optical fiber 2150. In a second receive operation mode, when a fiber cut in service receive optical fiber 2150 occurs, node 2110 receives data from node 2120 via protect receive optical fiber 2180.

Protection equipment 2130 and 2140 provide for switching (typically wave division multiplexed switching) between diversely routed service and protection optical fibers 2150, 2160, 2170, and 2180. Protection equipment 2130 and 2140 typically comprise branch units in relatively close physical proximity to nodes 2110 and 2120, and may further comprise optical repeaters, amplifiers, and other optical transmission related devices.

Figure 22:
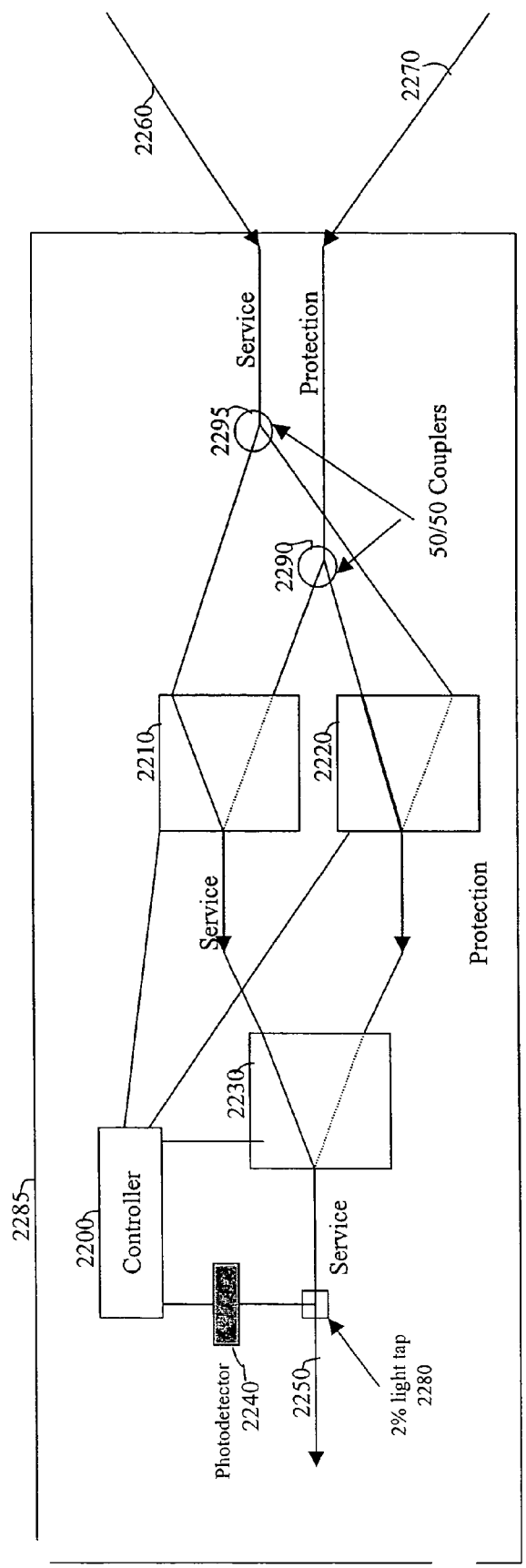
FIG. 22 is a block diagram of a branch unit according to a first embodiment of the invention.

A first embodiment of a fiber optic system is shown by the block diagram of FIG. 22. Branch unit 2285, in this block diagram depicted as a receiving branch unit, according to the first embodiment is optically coupled to service receive optical fiber 2260 and protect receive optical fiber 2270. Service optical fiber 2250 is the primary transmission path optically connected to a receiving node. In reference to FIG. 21, service receive optical fiber 2260 correlates to service receive optical fiber 2150, and protect receive optical fiber 2270 correlates to protect receive optical fiber 2180. Service optical fiber 2250 correlates to a receive path of optical fiber 2190.

Service receive optical fiber 2260 obtained from a first branch path is optically split via 50/50 optical coupler 2295. Split 50/50 service receive optical fiber is optically connected to a first input of a first 1×2 switch 2210 and optically connected to a second input of the second 1×2 switch 2220. Similarly, protection receive optical fiber 2270 obtained from a second branch path is optically split via 50/50 optical coupler 2290. Split 50/50 protect receive optical fiber is optically connected to a second input of the first 1×2 switch 2210 and optically connected to a first input of the second 1×2 switch 2220.

The output of the first 1×2 switch 2210 is provided to a first input of a third 1×2 switch 2230, and the output of the second 1×2 switch 2220 is provided to a second input of the third 1×2 switch 2230. The output of the third 1×2 switch 2230 is coupled to the primary transmission path 2250.

A light tap 2280 is provided at the output of the third 1×2 switch 2230, and a photodetector 2240 is coupled to the light tap 2280 to detect an output signal level. Information from the photodetector 2240 is provided to a processor or controller 2200. Based on the information provided, the processor 2200 controls the first, second and third 1×2 switches 2210, 2220, 2230 to be set to a particular state, either first input port to output port or second input port to output port.

As shown in FIG. 22, in normal operation mode, the first 1×2 switch 2210 is set to provide the service input on the first input port to its output port, and the second 1×2 switch 2220 is set to provide the protection input on the first input port to its output port. The third 1×2 switch 2230 is normally set to provide the service input on its first input port as provided to it by the output port of the first 1×2 switch 2210, to its output port. As a result, under normal operation mode, the service path is provided to the primary transmission path optically connected to a receiving node at the output of the third 1×2 switch 2230.

When a failure in the service path is determined by the processor 2200 due to no (or less than some predetermined threshold) signal strength being detected by the photodetector 2240, the third 1×2 switch 2230 is switched, under control of the processor 2200, to couple the second input port containing signals on the protection path to the output port of the third 1×2 switch 2230. This switch effectively maintains the network even when a fiber cut exists on the service path.

However, if the third 1×2 switch 2230 is malfunctioning in that it will not allow itself to be set to the second input port-to-output port mode, then the first 1×2 switch 2210 may be switched under control of the processor 2200 to couple the protection signals received on its second input port to its output port. In this scenario, the protection signals are received on the first input port of the 1×2 switch 2200 and then output onto the main optical path coupled to the output of the third 1×2 switch 2230.

The system according to the first embodiment can also operate with a malfunction of the first 1×2 switch 2210 by switching the second 1×2 switch 2220 to provide the proper signal path to the third 1×2 switch 2230. Thus, the branch unit 2285 according to the second embodiment of the invention is capable of maintaining network integrity even if one of the 1×2 switches 2210, 2220, 2230 fails.

In the first embodiment, a high voltage switch (not shown) is optionally provided at the branch unit 2285 so that failed legs can be shorted to ground to allow those failed legs to be repaired, as explained in some detail above. The high voltage switch is preferably commanded by way of the network management system, so that the leg under repair is switched to a load (not shown) coupled to the high voltage switch when the leg is being repaired.

Additionally, a second photodiode, light tap and processor may be provided at the branch units according to any of the embodiments described herein, in order to provide an additional level of redundancy. For each of the embodiments described herein, failure of a service path can be detected very quickly since there are few if any propagation delays, and thus the processor can be notified of (or detect) a problem on a service path and rapidly command a switch to a protection path. Reconfiguration times substantially under a few milliseconds can be achieved from first detection of a failure on a service path, to switching to an appropriate protection path in the first and second embodiments.

As an alternative configuration of the first embodiment shown in FIG. 22, a first photodiode may be provided at the output of the first 1×2 switch 2210, and a second photodiode may be provided at the output of the second 1×2 switch 2220. The first photodiode monitors switchover to the backup line, and the second photodiode monitors loss of signal in the service line. If the output of the second photodiode goes below a predetermined level (thereby indicating loss of signal in the service line), the first 1×2 switch 2210 is switched to provide the protection signal on its output port. The first photodiode monitors the switchover to backup. If, after the first 1×2 switch 2210 has been switched, the predetermined level is not met, as determined by the second photodiode, the second and third switches 2220, 2230 are triggered, to provide the protection signal to the main output path. Additionally, the switchover to the backup or protection signal can be done in the first 1×2 switch 2210.

Figure 23:
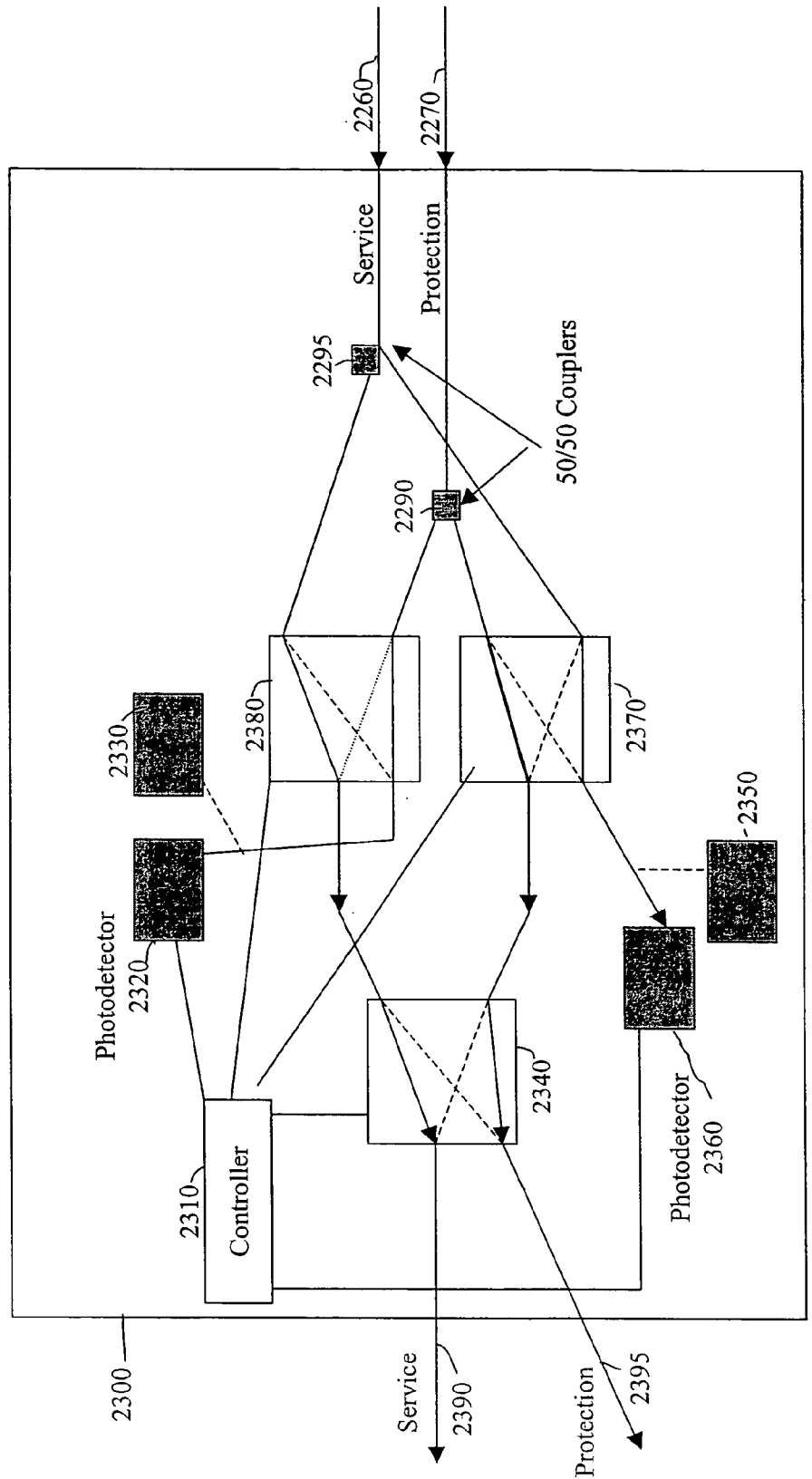
FIG. 23 is a block diagram of a branch unit according to a second embodiment of the invention.

A second embodiment of a fiber optic system is shown by the block diagram of FIG. 23. This second embodiment comprises a redundant 2×2 latching switch architecture for an automatically switched redundant switch structure, utilized in a branch unit 2300.

Similar to the first embodiment, service receive optical fiber 2260 obtained from a first branch path is optically split via 50/50 optical coupler 2295. Split 50/50 service receive optical fiber is optically connected to a first input of a first 2×2 switch 2380 and optically connected to a second input of a second 2×2 switch 2370. Similarly, protection receive optical fiber 2270 obtained from a second branch path is optically split via 50/50 optical coupler 2290. Split 50/50 protect receive optical fiber is optically connected to a second input of the first 2×2 switch 2380 and optically connected to a first input of the second 2×2 switch 2370.

A first output of the first 2×2 switch 2380 is provided to a first input of a third 2×2 switch 2340, and a second output of the first 2×2 switch 2380 is provided to a photodetector 2320. A first output of the second 2×2 switch 2370 is provided to a second input of a third 2×2 switch 2340, and a second output of the second 2×2 switch is provided to a photodetector 2360.

A first output of the third 2×2 switch 2340 is optically coupled to the primary service transmission path 2390. A second output of the third 2×2 switch 2340 is optically coupled to the secondary protection transmission path 2395.

Under normal operating conditions, a first 2×2 switch 2380 receives the service signal on its first input port, and provides that signal to its first output port. A second input port of the first 2×2 switch 2380 receives the protection signal, and provides the protection signal to a second output port of the first 2×2 switch 2380. A first photodetector 2320, for example a photodiode, is provided at the second output port of the first 2×2 switch 2380, and is used to monitor switchover to the protection line.

Under normal operating conditions, a second 2×2 switch 2370 receives the protection signal received on its first input port and provides that signal to its first output port. A second input port of the second 2×2 switch 2370 receives the service signal, and provides the service signal to a second output port of the second 2×2 switch 2370. A second photodetector 2360, for example a photodiode, is provided at the second output port of the second 2×2 switch 2370, and is used to monitor loss-of signal in the service path.

Under normal operating conditions, the first output port of the first 2×2 switch 2380 is provided to a first input port of a third 2×2 switch 2340, and the first output port of the second 2×2 switch 2370 is provided to a second input port of the third 2×2 switch 2340. The service signal received at the first input port of the third 2×2 switch 2340 is provided to a first output port of the third 2×2 switch 2340, which corresponds to the main optical path 2390. The second output port of the third 2×2 switch 2340, which corresponds to the protection optical path 2395, under normal operating conditions may be utilized to provide protection data.

As explained above, the second photodiode 2360 monitors the service line signal under normal operating conditions, since the service line signal is provided to the second output port of the second 2×2 switch 2370 under those conditions. When the second photodiode 2370 detects an output level below a predetermined level, thereby indicating a loss of signal in the service line, the controller 2310 provides a control signal to the first 2×2 switch 2380 so that the protection signal (received at the second input port of the first 2×2 switch 2370) is now provided to the first output port of the first 2×2 switch 2380. If the switchover of the first 2×2 switch 2380 occurs properly, this results in the protection signal being provided to the first input port of the third 2×2 switch 2340, and thereby to the main optical path (coupled to the first output port of the third 2×2 switch 2340).

The first photodiode 2320 monitors the switchover to the protection line. After the first 2×2 switch 2380 has been instructed to be switched over, the first photodiode 2320 detects whether the second output port of the first 2×2 switch 2380 transitions state. If there is a malfunction in the first 2×2 switch 2380, the switchover instruction, as provided to the first 2×2 switch 2380 by the controller 2310, may not have resulted in proper switchover occurring at the first 2×2 switch 2380. In that case, the third 2×2 switch 2340 would be instructed by the controller 2310 to couple its second input port to its first output port, and to couple its first input port to its second output port. This would result in the protection signal, which is provided to the second input port of the third 2×2 switch 2340 by way of the second 2×2 switch 2370, being provided to the main optical path that is coupled to the first output port of the third 2×2 switch 2340. The configuration shown in FIG. 23 also allows for switches 2370 and 2340 to send service data through an alternate route if first switch 2380 fails.

Optional backup photodetectors 2330, 2350 are also shown in FIG. 23, and are provided in case the primary photodetectors 2320, 2360 are malfunctioning. Similarly, an optional controller (not shown) may also be provided at the branch unit 2300. With the configuration as shown in FIG. 23, a 6-7 dB loss in any one path from the input to the output of the branch unit 2300 can be expected due to, for example, the splitters employed therein.

The aforementioned advantages of the first embodiment are also applicable to this second embodiment. Further, this second embodiment may be implemented in various points throughout an optical network to provide line switching in the event of a fiber cut. For example, branch unit 2300 may be implemented in Baltimore, Md. between a node in Washington, D.C. and New York, N.Y. In the event of a fiber cut between Baltimore and Washington, branch unit 2300 may switch optical fibers for just that section, while not affecting the section from Baltimore, Md. to New York, N.Y. This second embodiment further provides additional line monitoring and may be implemented with different switch technology than employed in the first embodiment.

Figure 24:
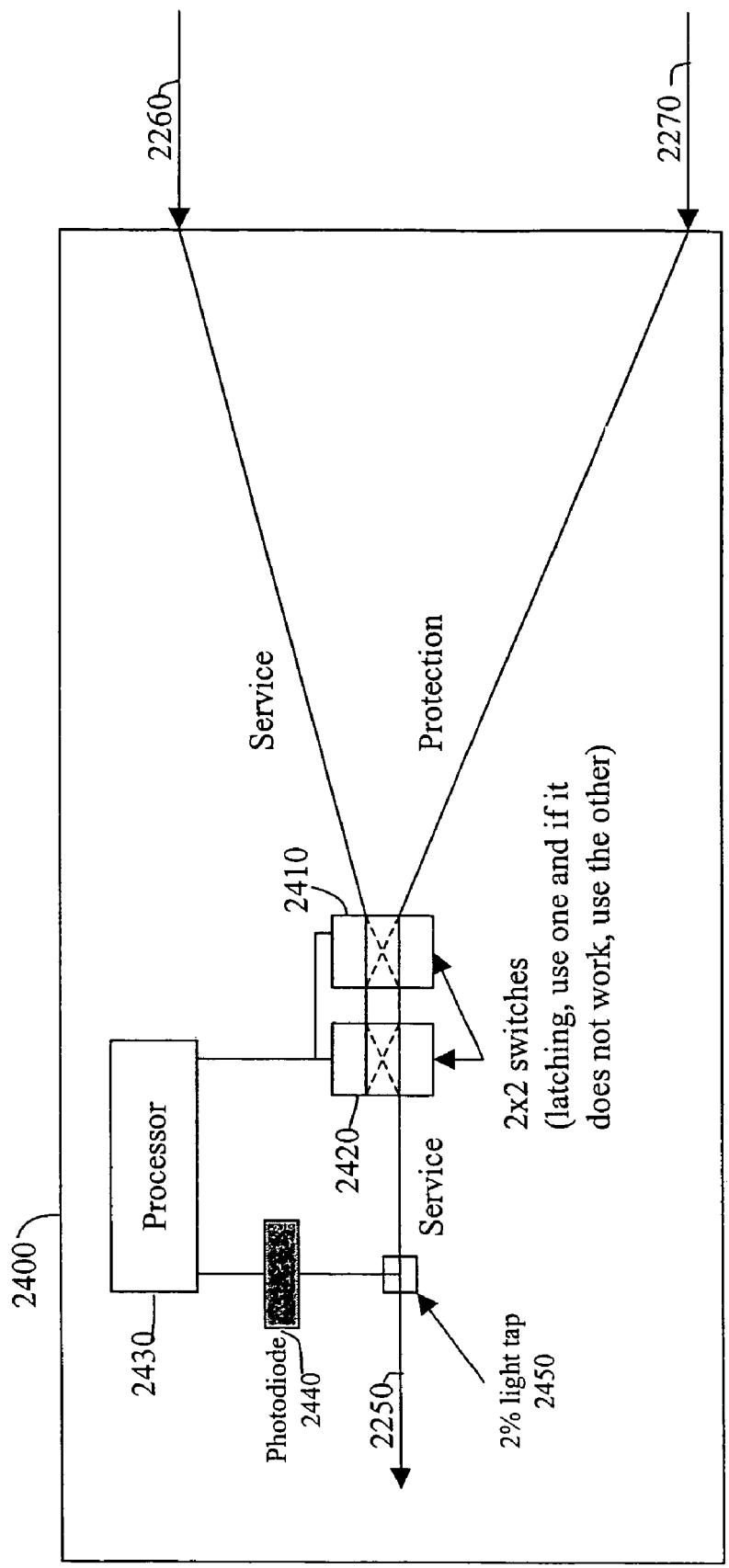
FIG. 24 is a block diagram of a branch unit according to a third embodiment of the invention.

A third embodiment of a fiber optic system is shown by the block diagram of FIG. 24. The branch unit 2400 comprises two 2×2 switches 2420 and 2410. Service receive optical fiber 2260 is optically connected to a first input of a first 2×2 switch 2410. Protect receive optical fiber 2270 is optically connected to a second input of a first 2×2 switch 2410. A first output of the first 2×2 switch 2410 is optically connected to a first input of a second 2×2 switch 2420. A second output of the first 2×2 switch 2410 is optically connected to a second input of a second 2×2 switch 2420.

In the third embodiment, under normal operating conditions, identical service and protection signals are received via optical fibers 2260 and 2270, albeit on different input ports, of the first 2×2 switch 2410. Thus, the first 2×2 switch 2410 receives, on its first input port, the primary or service information signals sent on the first branch path 2260. The first 2×2 switch 2410 also receives, on its second input port, the backup or protection information signals sent on the second branch path 2270. In the preferred implementation of the third embodiment, the first and second 2×2 switches 2410, 2420 are preferably latching switches, which maintain their most recent switch position even if loss of power occurs.

At least two 2×2 switches 2410 and 2420 are provided in the branch unit 2400 of the third embodiment to handle a case in which one of the 2×2 switches 2410, 2420 is malfunctioning. In that regard, if the first 2×2 switch 2410 is malfunctioning in a manner such that the input from the first input port cannot be switched to the second output port of the first 2×2 switch 2410, then the second 2×2 switch 2420 is used to provide the proper signal onto primary transmission path 2250, which corresponds to the output of the second 2×2 switch 2420.

For example, assume that the service or primary signals are provided on the first branch path and that the protection or backup signals are provided on the second branch path. Under normal operating conditions, the first 2×2 switch 2410 and the second 2×2 switch 2420 are operated so that they are in a straight-through-output, and not-crossed-output, state. That is, the first input port is coupled to the first output port, and the second input port is coupled to the second output port, in the normal, straight-through-output state. As shown in FIG. 24, this means that the service signals received at the second input port of the first 2×2 switch 2410 are sent through the second output port of the first 2×2 switch 2410, and then to the first input port of the second 2×2 switch 2420, then to the output port of the second 2×2 switch 2420, with the output port coupled to the main optical path 250.

Now, assume that a problem occurs on the first branch path in that a fiber cut exists somewhere on the first branch path. In that case, no service signals are provided to the second input port of the first 2×2 switch 2410 due to the fiber cut on the first branch path, and thus no signals are received at the second output port of the second 2×2 switch 2420. The photodetector 2440 provides a "no signal" indication to the processor 2430, which then reconfigures the first and second 2×2 switches 2410, 2420 to provide the protection signals on the second branch path to the output port of the second 2×2 switch 2420.

This reconfiguration can be done by one of two ways. The first way is to set the first 2×2 switch 2410 to a cross-connect mode, whereby the first output port of the first 2×2 switch 2410 is coupled to the second input port of the first 2×2 switch 2410, and the second output port of the first 2×2 switch 2410 is coupled to the first input port of the first 2×2 switch 2410. The second 2×2 switch 2420 is left in the pass-through, non-cross-connected state. By this reconfiguration of the first 2×2 switch 2410, the protection signals received from the second branch path are provided to the first branch path, which corresponds to the output port of the second 2×2 switch 2420.

Now, assume that even after this reconfiguration the photodetector 2440 still does not detect any signal being received at the output port of the second 2×2 switch 2420. In this case, the first 2×2 switch 2410 may not have switched over to its cross-coupling mode even though it was instructed to do so by the processor 2430. In this case, the second 2×2 switch 2420 provides the cross-coupling needed to provide the protection signals to the output port of the second 2×2 switch 2420. In particular, when the processor 2430 is notified by the photodetector 2440 that a signal is still not being received at the output port of the second 2×2 switch 2420, even after the processor 2440 had instructed the first 2×2 switch 2410 to change to a cross-coupling mode, then the processor 2430 determines that the first 2×2 switch 2410 is malfunctioning, and thereby instructs the second 2×2 switch 2420 to operate in the cross-coupling mode. This effectively provides the protection signals to the output port of the second 2×2 switch 2420, the output port being coupled to the main optical path 2250. Therefore, the first embodiment of the invention provides for non-interrupted service when fiber cuts exist on the first branch path, but also when a 2×2 switch in a branch unit is malfunctioning. An advantage of this configuration is that losses due to splitters in the branch unit can be avoided.

Figure 25:
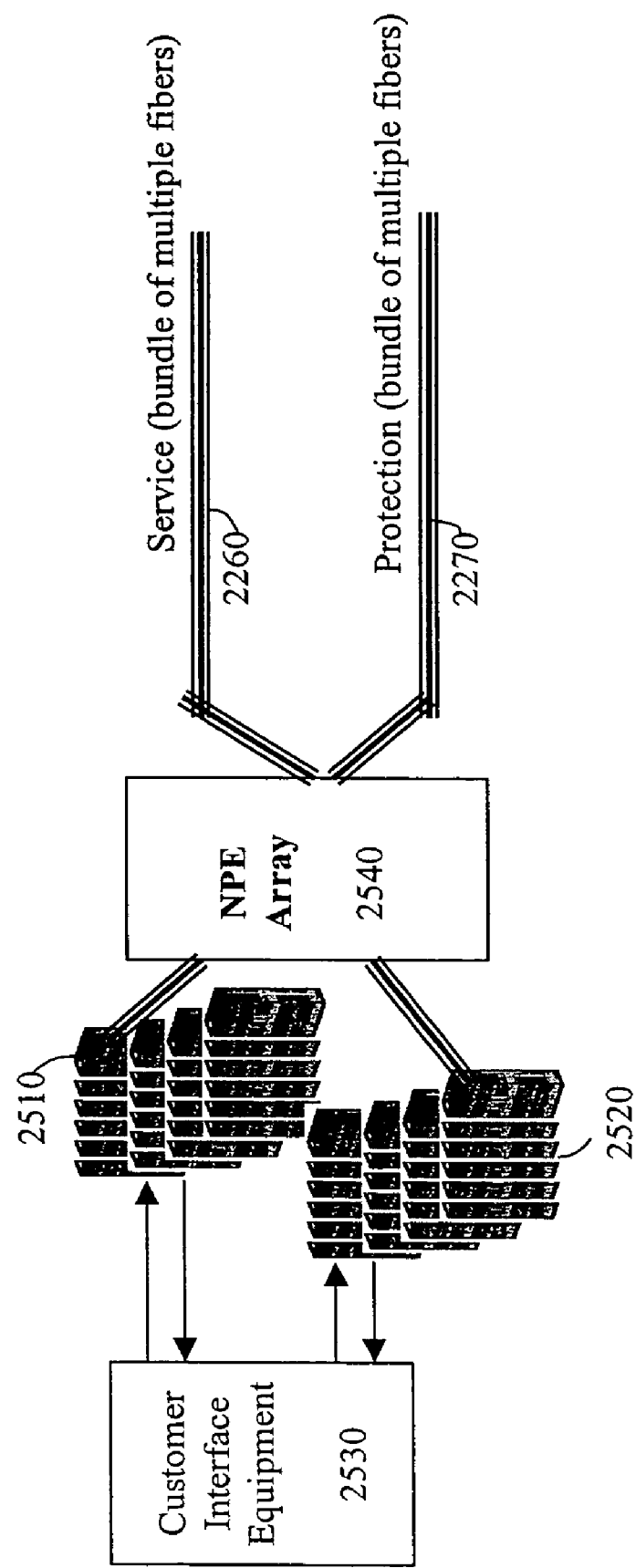
FIG. 25 is a block diagram of a fourth embodiment of a fiber optic system with a WDM network protection equipment (NPE) array.

A fourth embodiment of a fiber optic system is shown by the block diagram of FIG. 25. In this fourth embodiment, network protection equipment (NPE) 2540 is provided in optical communication with customer interface equipment 2530. NPE 2540 comprises an array of branch units as described by any one of the aforementioned embodiments in FIG. 22-24.

For example, NPE 2540 may comprise an array of eight branch units each comprising three switches as described in a first embodiment.

On a transmit and receive side, there is an array of branch units in NPE 2540, one for each of the WDM signals to be provided to fiber bays 2510 and 2520. Each of the array of branch units of NPE 2540 has a photodiode detector at the output of the array, to thereby provide information to a processor so as to either switch one or more switches in each array, if there is no signal detected at the output of the array.

Referring now to FIG. 24, which shows a configuration that may be utilized for one WDM signal of NPE 2540 according to the fourth embodiment, if the service line for that WDM signal is non-operative, then the output of the 2×2 switch 2420 would indicate no signal present, as detected by photodiode 2440. This information is provided to processor 2430, which provides control signals to switches 2420, 2410 to provide the protection line for that WDM signal to the output of switch 2420.

Similarly, a structure as shown in FIG. 22 or in FIG. 23 may be utilized for each of the WDM signals of NPE 2540 according to the fourth embodiment.

As an alternative configuration of the fourth embodiment, one photodiode may be utilized for more than one WDM signal, whereby outputs from a plurality of switches are provided to one photodiode, whereby a light tap from each of those switches is provided to the one photodiode. With this configuration, the photodiode can detect a problem in a group of WDM signals, which may indicate a cut at a group level.

Figure 26:
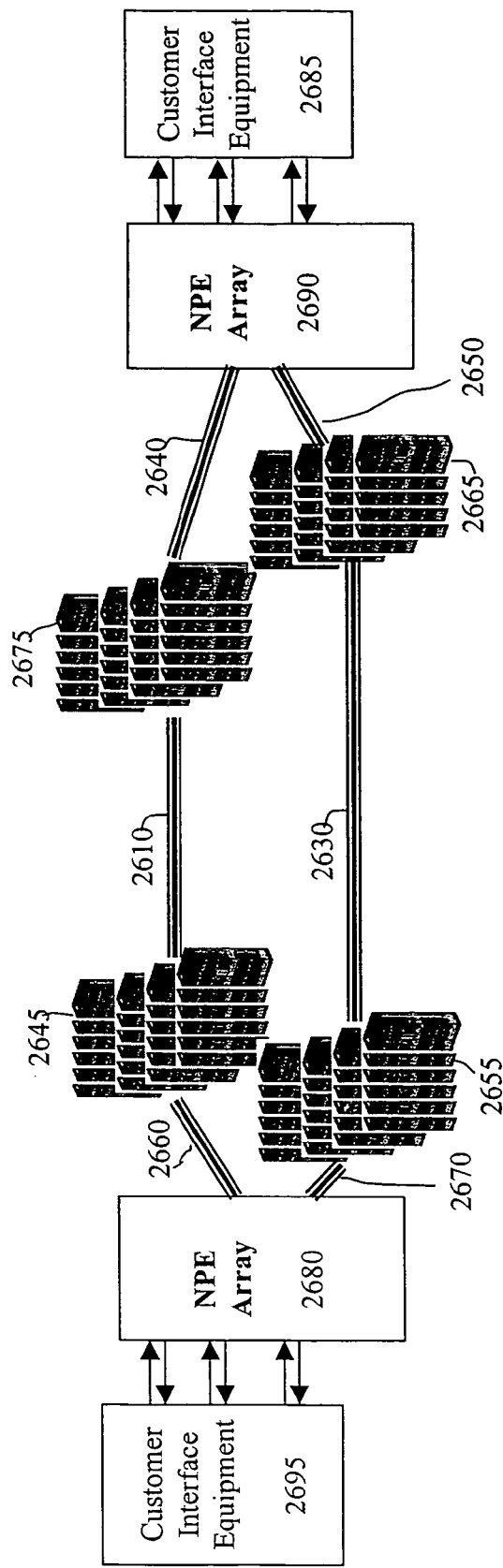
FIG. 26 is a block diagram of a fifth embodiment of a fiber optic system with a NPE array.

A fifth embodiment of a fiber optic system is shown by the block diagram of FIG. 26. NPEs 2680 and 2690 are provided in optical communication with customer interface equipment (CIE) 2695 and 2685 respectively. In this fifth embodiment, fiber bays 2645 and 2675 communicate via service optical fiber 2610 and fiber bays 2655 and 2665 communicate via protect optical fiber 2630. Typically fiber bays 2645, 2675, 2655, and 2665 transmit and receive WDM signals via optical fibers 2610 and 2630. Fiber bays 2645, 2675, 2655, and 2665 demultiplex the WDM signals to single channel signals which are transmitted and received to NPEs 2680 and 2690 via optical fibers 2660, 2670, 2640, and 2650.

A fiber optic system according to this fifth embodiment is similar in function to that described by the fourth embodiment. The main difference between the two is that the NPEs 2680 and 2690 of the fifth embodiment operate on single channel signals, whereas NPE 2540 of the fourth embodiment operates on WDM signals. Otherwise, the aforementioned description of NPE 2540 also applies to NPEs 2680 and 2690 according to this fifth embodiment.

Figure 27:
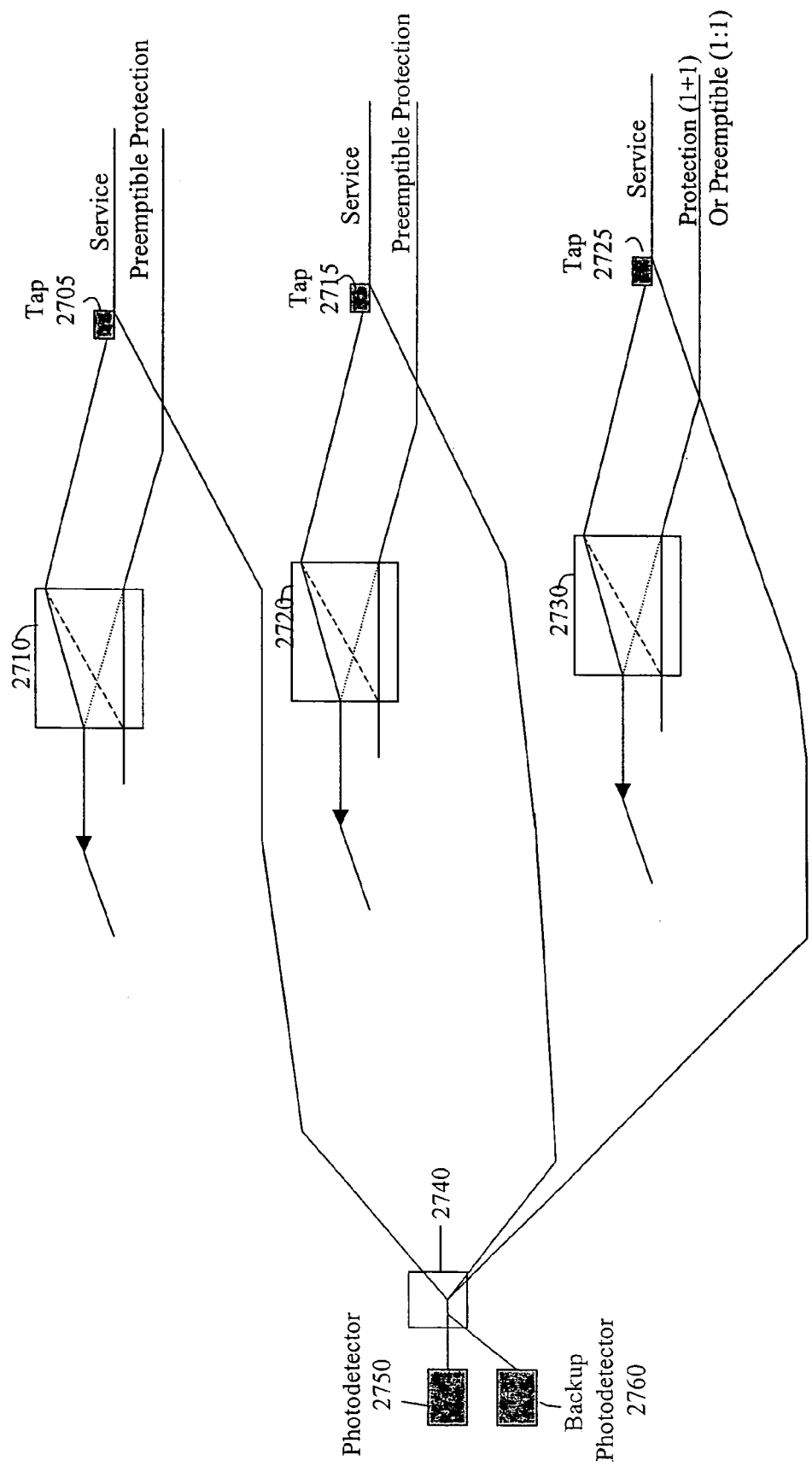
FIG. 27 is a block diagram of a sixth embodiment of a NPE array of switches.

A sixth embodiment of a fiber optic system is shown by the block diagram of FIG. 27. FIG. 27 depicts an array of switches 2710, 2720 and 2730 as may be implemented in an NPE as described in a fourth or fifth embodiment of FIGS. 25 and 26. In this configuration, taps 2205, 2715, and 2725 provide service optical fiber to a first input of switches 2710, 2720 and 2730 as shown. Taps 2705, 2715, and 2725 further provide service optical fiber to combiner 2740 which outputs a combined service optical fiber to photodetector 2750. The functionality of the switches is similar to that of a second embodiment as shown in FIG. 23, thus only the differences will be further described.

Photodetector 2750 may provide information to a processor (not shown) regarding the status of the service optical fiber for a group of switches 2710, 2720, and 2730. When the photodetector detects a drop in optical strength due to signal loss, the processor may control switches 2710, 2720, and 2730 to provide connection via the protect optical fiber.

In a sixth embodiment, taps 2705, 2715, and 2725 have different tap strengths to allow photodetector 2750 to tell which service optical fiber has failed. For example, tap 2705 may be a 1% tap, tap 2715 may be a 5% tap, and tap 2725 may be a 10% tap for a combined tap of 16%. When the photodetector 2750 detects a 10% loss, the service optical fiber connected to switch 2730 has failed and the processor can switch switch 2730 to provide connection via the protect optical fiber. Similarly, when the photodetector 2750 detects a 6% loss, the service optical fibers connected to switches 2710 and 2720 have failed and the processor can switch switches 2710 and 2720 to provide connection via the protect optical fibers. Other configurations, tap percentages, and the like may be employed as would be readily apparent to one skilled in the art. Further, backup photodetector 2760 may be provided in case of a failure in photodetector 2750.

Figure 28:
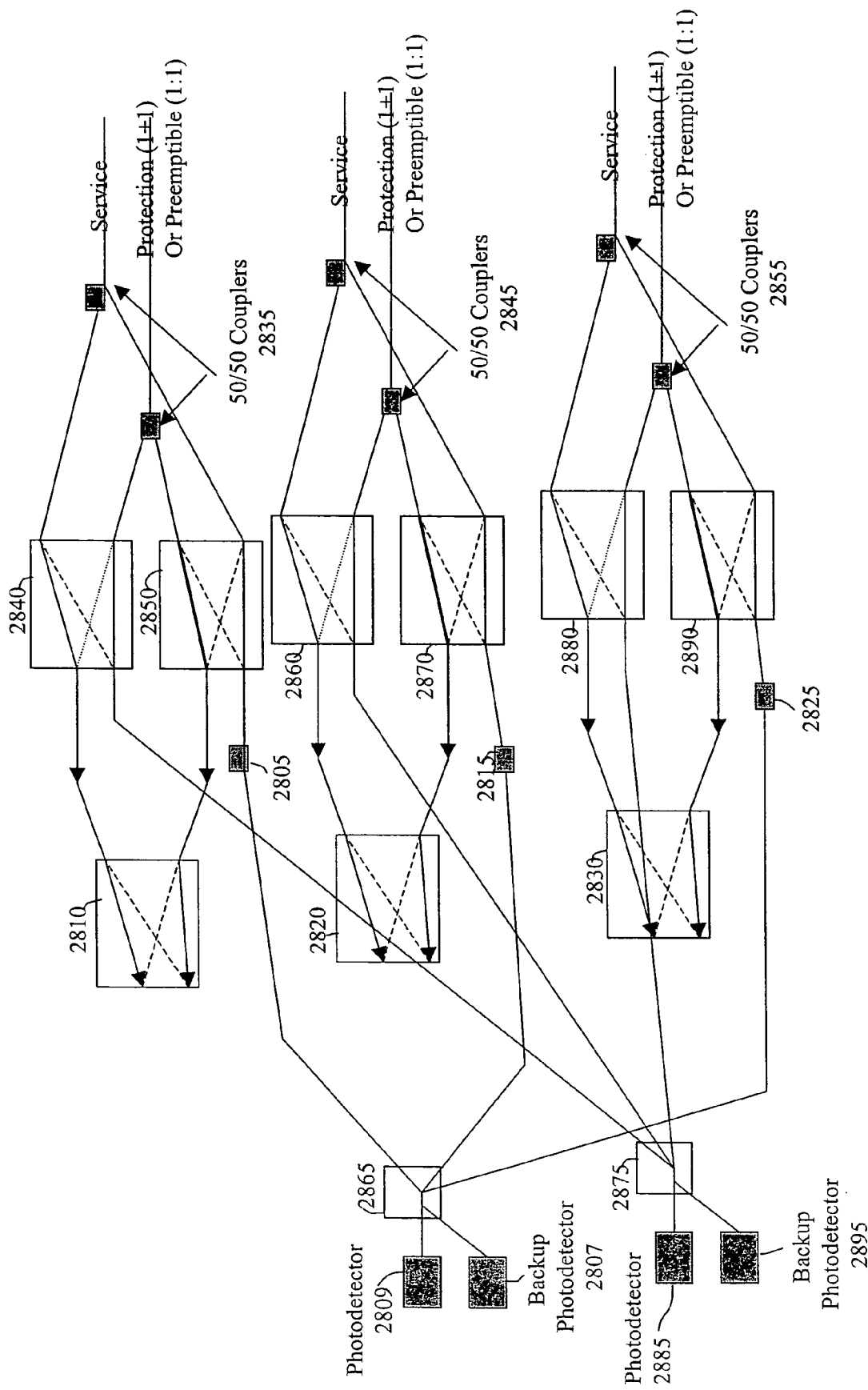
FIG. 28 is a block diagram of a seventh embodiment of a NPE array of switches.

A seventh embodiment of a fiber optic system is shown by the block diagram of FIG. 28. FIG. 28 depicts an array of switches 2810, 2820, 2830, 2840, 2850, 2860, 2870, 2880, and 2890 as may be implemented in an NPE as described in a fourth or fifth embodiment of FIGS. 25 and 26. In this example, branch units comprise three switches 2810, 2840, and 2850 in a first branch unit, 2820, 2860, and 2870 in a second branch unit, and 2830, 2880, and 2890 in a third branch unit similar to the branch unit described in the second embodiment of FIG. 3. Couplers 2835, 2845, and 2855 may be identical to the couplers 2290 and 2295 in the second embodiment of FIG. 3.

In this seventh embodiment, the second output of switches 2850, 2870, and 2890 are provided to optical combiner 2865 which, in turn, provides a combined optical signal to photodetector 2809. Similarly, the second output of switches 2840, 2860, and 2880 are provided to optical combiner 2875 which, in turn, provides a combined optical signal to photodetector 2885.

Similar to photodetector 2750 in a sixth embodiment of FIG. 27, photodetector 2809 detects a failure on service optical fibers connected to switches 2850, 2870, and 2890. When a failure occurs in a service optical fiber, a processor in communication with the photodetector 2809 can switch from service optical fiber to protect optical fiber. Similarly, photodetector 2885 detects a failure on protect optical fibers connected to switches 2840, 2860, and 2880. When a failure occurs in a protect optical fiber, a processor in communication with the photodetector 2885 can notify a user that the protect optical fiber has failed.

Optionally attenuators 2805, 2815, and 2825 may be provided such that the amount of optical light received by combiner 2865 from each of the service optical fibers is different. As aforementioned in a sixth embodiment of FIG. 27, using different % attenuators (FIG. 26 similarly used varying % taps), photodetector 2809 may be able to detect which of the service optical fibers has failed.

Optionally, attenuators may also be provided on the protect optical fibers. Further, backup photodetectors 2807 and 2895 may be provided in case of a failure in photodetectors 2809 or 2885.

A fiber optical architecture and a fiber optical collapsed ring architecture have been described according to several embodiments of the present invention. Many modifications and variations may be made to the techniques and structures described and illustrated herein without departing from the spirit and scope of the invention. Accordingly, it should be understood that the methods and apparatus described herein are illustrative only and are not limiting upon the scope of the invention. For example, the description of components and units as given above may be utilized for either land-based units or for underwater units. However, as will be appreciated by those skilled in the art, underwater units (e.g., repeaters, switches and branch units) are typically hermetically sealed.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

The invention claimed is:

1. An optical communications system, comprising:
   a submarine optical communications system;
   a landing station associated with the submarine optical communications system;
   a terrestrial optical communications system;
   a point of presence associated with the terrestrial optical communications system including:
      a first set of transmit equipment associated with a first wavelength division multiplexed optical connection between the point of presence and the landing station and
      a second set of transmit equipment associated with a second wavelength division multiplexed optical connection between the point of presence and the landing station and routed diversely from the first wavelength division multiplexed optical connection; and,
      an optical switch in the point of presence and selectively connecting the first and second sets of transmit equipment to the terrestrial optical communications system.

2. The system of claim 1, wherein the first and second sets of transmit equipment include transmitters/receivers.

3. The system of claim 2, wherein the first and second sets of transmit equipment include WDM and optical conditioning units.

4. The system of claim 1, further comprising an optical switch in the landing station for selectively connecting the submarine optical communications system to the first and second wavelength division multiplexed optical connections.

5. The system of claim 4, further comprising at least one optical amplifier in the first and second wavelength division multiplexed optical connections.

6. The system of claim 1, wherein optical signals undergo WDM in the point of presence and do not undergo WDM in the landing station.

7. The system of claim 1, further comprising an optical splitter in the landing station for splitting optical signals from the submarine optical communications system and providing split optical signals to the first and second wavelength division multiplexed optical connections.

8. The system of claim 1, wherein the optical switch in the point of presence includes channel level switches.

9. A method of optical signal protection in an optical communications system including a submarine optical communications system and a terrestrial optical communications system, comprising:

providing optical communications signals between the submarine optical communications system and the terrestrial optical communications system via first and second wavelength division multiplexed optical connections;

routing the first and second wavelength division multiplexed optical connections between a landing station associated with the submarine optical communications system and a point of presence associated with the terrestrial optical system, wherein the first and second wavelength division multiplexed optical connections are routed on diverse paths so as to provide a working path and a protect path, on the first and second wavelength division multiplexed optical connections, for optical signals passing between the submarine and terrestrial optical communications systems;

providing in the point of presence an optical switch selectively connecting the first and second wavelength division multiplexed optical connections to the terrestrial optical communications system;

detecting a break in one of the first and second wavelength division multiplexed optical connections; and connecting the one of the first and second wavelength division multiplexed optical connections to the terrestrial optical communications system in which the break was not detected.

10. The method of claim 9, wherein connecting includes: splitting optical signals received from the submarine optical communications system; and providing split optical signals on the first and second wavelength division multiplexed optical connections.

11. The method of claim 9, wherein WDM is performed between the submarine and terrestrial optical communications systems only at a point of presence, which is located between the terrestrial optical communications system and the first and second wavelength division multiplexed optical connections.

12. An optical communications system, comprising:
   a submarine optical communications system;
   a first landing station associated with the submarine optical communications system;
   a second landing station associated with the submarine optical communications system;
   a submarine link between the first and second landing stations;
   a terrestrial optical communications system;
   a point of presence associated with the terrestrial optical communications system;
   a first wavelength division multiplexed optical connection between the point of presence and the first landing station;
   a second wavelength division multiplexed optical connection between the point of presence and the second landing station; and
   an optical switch in the point of presence and selectively connecting the first and second sets of transmit equipment to the terrestrial optical communications system.

13. The system of claim 12, wherein:
   the first landing station includes a first optical switch for selectively connecting the submarine optical communications system to one of the first wavelength division multiplexed optical connection and the submarine link; and the second landing station includes a second optical switch for selectively connecting the submarine optical communications system to one of the second wavelength division multiplexed optical connection and the submarine link.

14. The system of claim 13, wherein the submarine link provides a shared transit link during reconfiguration of at least one of the first and second optical switches.

15. The system of claim 12, wherein the submarine optical communications system includes a protection path which is routed through the first landing station, through the point of presence, and through the second landing station.

16. The system of claim 12, wherein the submarine link includes at least one optical signal amplifier.

17. The system of claim 12, wherein the submarine optical communications system has 1+1 protection and wherein the first and second landing stations interconnect the submarine and terrestrial optical communications systems.

* * * * *